US006702090B2

(12) United States Patent
Nakamura et al.

(10) Patent No.: US 6,702,090 B2
(45) Date of Patent: Mar. 9, 2004

(54) POWER TOOL AND SPINDLE LOCK SYSTEM

(75) Inventors: Daijiro Nakamura, Hyugo (JP); Robert W. Klemm, Colgate, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 10/096,441

(22) Filed: Mar. 12, 2002

(65) Prior Publication Data

US 2002/0130007 A1 Sep. 19, 2002

Related U.S. Application Data

(63) Continuation-in-part of application No. 09/995,256, filed on Nov. 27, 2001, now abandoned.

(30) Foreign Application Priority Data

Mar. 14, 2001 (JP) ....................................... 2001-071814
Sep. 12, 2001 (JP) ....................................... 2001-276044

(51) Int. Cl.$^7$ ................................................ F16D 19/00
(52) U.S. Cl. ........................ 192/223.2; 192/38; 173/217
(58) Field of Search ........................... 192/223.1, 223.2, 192/38; 173/216, 217

(56) References Cited

U.S. PATENT DOCUMENTS

| | | | |
|---|---|---|---|
| 1,503,809 | A | 8/1924 | Schulz et al. |
| 3,243,023 | A | 3/1966 | Boyden |
| 3,545,776 | A | 12/1970 | Haviland |
| 3,872,951 | A | 3/1975 | Hastings, Jr. |
| 4,173,849 | A | 11/1979 | Mar |

(List continued on next page.)

FOREIGN PATENT DOCUMENTS

| | | |
|---|---|---|
| CA | 2092018 | 3/1994 |
| EP | 0 031 433 | 7/1981 |
| EP | 0 416 612 A2 | 3/1991 |
| EP | 0 600 854 A1 | 6/1994 |
| GB | 2 115 337 A | 9/1983 |

OTHER PUBLICATIONS

Advertisement for Milwaukee Electric Tool Corp. “Cordless 2.4 Volt Screwdrivers,” published prior to Nov. 2001.
Service Parts List for Milwaukee Electric Tool Corporation ⅜ Inch Drill with Spindle Lock, dated Jan. 2001 (Statement of Relevance attached).
Drawing of Spindle Lock Assembly, Part No. 14–29–0040, from Milwaukee Electric Tool Corporation ⅜ Inch Drill with Spindle Lock, Date unknown.
Drawing of Click Spring, Part No. 40–50–8525, from Milwaukee Electric Tool Corporation ⅜ Inch Drill with Spindle Lock, Date unknown.
Drawing of Spindle Gear, Part No. 32–75–0106, from Milwaukee Electric Tool Corporation ⅜ Inch Drill with Spindle Lock, Date Unknown.

*Primary Examiner*—Richard M. Lorence
(74) *Attorney, Agent, or Firm*—Michael Best & Friedrich LLP

(57) ABSTRACT

A power tool and spindle lock. The spindle lock includes a spring and a detent arrangement to control and buffer the rotation of the spindle and to delay the engagement of the locking elements. In some aspects, the invention provides a spindle lock including a spring element which applies substantially equal spring force to delay the operation of the spindle lock when the spindle is rotated in the forward direction or in the reverse direction. In some aspects, the invention provides two spring members which cooperate to apply the substantially equal force to delay the operation of the spindle lock when the spindle is rotated in the forward direction or in the reverse direction.

49 Claims, 18 Drawing Sheets

U.S. PATENT DOCUMENTS

| | | | |
|---|---|---|---|
| 4,199,160 A | | 4/1980 | Bent |
| 4,390,311 A | | 6/1983 | Kuhlmann |
| 4,407,615 A | | 10/1983 | Kuhlmann |
| 4,460,296 A | | 7/1984 | Sivertson, Jr. |
| 4,498,682 A | | 2/1985 | Glore |
| 4,573,380 A | | 3/1986 | Bald |
| 4,582,331 A | | 4/1986 | Rohm |
| 4,695,065 A | | 9/1987 | Komatsu et al. |
| 4,775,269 A | | 10/1988 | Brix |
| 4,804,048 A | | 2/1989 | Porth, Jr. |
| 4,819,319 A | | 4/1989 | Rohm |
| 4,824,298 A | | 4/1989 | Lippacher et al. |
| 4,834,192 A | | 5/1989 | Hansson |
| 4,848,779 A | | 7/1989 | Wheeler et al. |
| 5,016,501 A | | 5/1991 | Holzer, Jr. |
| 5,044,643 A | | 9/1991 | Nakamura |
| 5,172,923 A | | 12/1992 | Nakamura |
| 5,183,274 A | | 2/1993 | Sakamaki |
| 5,236,206 A | | 8/1993 | Rohm |
| 5,261,679 A | | 11/1993 | Nakamura |
| 5,271,471 A | | 12/1993 | Sasaki |
| 5,272,845 A | | 12/1993 | Burkley |
| 5,277,527 A | | 1/1994 | Yokota et al. |
| 5,322,303 A | | 6/1994 | Nakamura |
| 5,325,931 A | | 7/1994 | Woods |
| 5,375,857 A | | 12/1994 | Rohm |
| 5,375,858 A | | 12/1994 | Rohm |
| 5,407,215 A | | 4/1995 | Yang |
| 5,430,944 A | | 7/1995 | Shilling |
| 5,458,345 A | | 10/1995 | Amyot |
| 5,464,230 A | | 11/1995 | Rohm |
| 5,533,581 A | | 7/1996 | Barth et al. |
| 5,558,478 A | | 9/1996 | Odendahl et al. |
| 5,577,872 A | | 11/1996 | Nakamura |
| 5,624,013 A | | 4/1997 | Tsai |
| 5,653,294 A | | 8/1997 | Thurler |
| 5,704,257 A | | 1/1998 | Kottke et al. |
| 5,732,805 A | | 3/1998 | Nakamura |
| 5,947,254 A | | 9/1999 | Jones |
| 5,984,022 A | | 11/1999 | Harman, Jr. et al. |
| 6,010,426 A | | 1/2000 | Nakamura |
| 6,176,801 B1 | | 1/2001 | Chen |
| 6,273,200 B1 | | 8/2001 | Smith et al. |
| 6,277,013 B1 | | 8/2001 | Sasaki et al. |
| 6,279,714 B1 | | 8/2001 | Hsu |
| 6,305,481 B1 | | 10/2001 | Yamazaki et al. |
| 6,311,787 B1 | | 11/2001 | Berry et al. |
| 6,497,316 B1 | * | 12/2002 | Hsu ........................ 192/223.2 |

FOREIGN PATENT DOCUMENTS

| | | | |
|---|---|---|---|
| GB | 2 236 968 | A | 4/1991 |
| GB | 2 285 003 | A | 6/1995 |
| JP | 58-217276 | A | 12/1983 |
| JP | 61-90881 | A | 5/1986 |
| JP | 63-63353 | B2 | 12/1988 |
| JP | 1-25667 | B2 | 5/1989 |
| JP | 4-59110 | B2 | 9/1992 |
| JP | 5-13789 | B2 | 2/1993 |
| JP | 7-219726 | | 8/1995 |
| WO | 95/00288 | | 1/1995 |
| WO | 95/01240 | | 1/1995 |
| WO | 96/19677 | | 6/1996 |
| WO | 97/27020 | | 7/1997 |
| WO | 01/78948 | A1 | 10/2001 |

* cited by examiner

POWER TOOL AND SPINDLE LOCK SYSTEM

RELATED APPLICATIONS

The present application is a continuation-in-part of application Ser. No. 09/995,256, filed Nov. 27, 2001, now abandoned.

FIELD OF THE INVENTION

The invention relates to power tools and, more particularly, to a spindle lock system for a power tool.

BACKGROUND OF THE INVENTION

A typical electric machine, such as a rotary power tool, includes a housing, a motor supported by the housing and connectable to a power source to operate the motor, and a spindle rotatably supported by the housing and selectively driven by the motor. A tool holder, such as a chuck, is mounted on the forward end of the spindle, and a tool element, such as, for example, a drill bit, is mounted in the chuck for rotation with the chuck and with the spindle to operate on a workpiece.

To assist the operator in removing and/or supporting the tool element in the tool holder, the power tool may include a spindle lock for preventing rotation of the spindle relative to the housing when a force is applied by the operator to the tool holder to remove the tool element. Without the spindle lock, such a force would tend to rotate the spindle relative to the housing. The spindle lock may be a manually-operated spindle lock, in which the operator engages a lock member against the spindle to prevent rotation of the spindle, or an automatic spindle lock, which operates when a force is applied by the operator to the tool holder.

There are several different types of automatic spindle locks. One type of automatic spindle lock includes a plurality of wedge rollers which are forced into wedging engagement with corresponding wedge surfaces when a force is applied by the operator to the tool holder. Another type of automatic spindle lock includes inter-engaging toothed members, such as a fixed internally-toothed gear and a movable toothed member supported on the spindle for rotation with the spindle and for movement relative to the spindle to a locked position in which the teeth engage to prevent rotation of the spindle.

To accommodate such automatic spindle locks, some rotational play or movement may be provided between the spindle and the driving engagement with the motor. The spindle lock operates (is engaged and disengaged) within this "free angle" of rotation between the spindle and the driving engagement of the motor.

SUMMARY OF THE INVENTION

One independent problem with the above-identified automatic spindle locks is that, when the motor is switched from an operating condition, in which the spindle is rotatably driven, to a non-operating condition, the inertia of the still-rotating spindle (and tool holder and/or supported tool element) causes the automatic spindle lock to engage to stop the rotation of the spindle relative to the motor within the free angle of rotation between the spindle and the motor. The engagement of the spindle lock can be sudden, causing an impact in the components of the spindle lock, resulting in noise (a big "clunk") and, potentially, damage to the components.

This problem is increased the greater the inertia acting on the spindle (i.e., with larger tool elements, such as hole saws). With the high-inertia tool elements, the spindle may rebound from the impact (of the spindle lock engaging), rotate in the opposite direction (through the free angle of rotation) and impact the driving engagement with the motor, and rebound (in the forward direction) to re-engage the spindle lock. Such repeated impacts on the spindle lock and between the spindle and the driving engagement of the motor causes a "chattering" phenomenon (multiple noises) after the initial impact and big "clunk".

Another independent problem with existing power tools is that, when the motor is switched from the operating condition to the non-operating condition, a braking force may be applied to the motor while the spindle (under the force of the inertia of the spindle (and tool holder and/or supported tool element) continues to rotate through the free angle. The braking of the motor (coupled with the continued rotation of the spindle) causes the automatic spindle lock to engage resulting in noise (a big "clunk" and/or "chattering") and, potentially, damage to the components.

The braking force applied to the motor can result from dynamic braking of the motor, such as by the operation of a dynamic braking circuit or as results in the operation (stopping) of a cordless (battery-powered) power tool. In other words, when the motor is stopped, the difference between the force rotating the spindle (the inertia of the spindle (and tool holder and/or supported tool element) and the force stopping the motor (i.e., whether the motor coasts or is braked) causes the automatic spindle lock to engage. The greater difference in these oppositely acting forces, the greater the impact(s) (a big "clunk" and/or "chattering") when the spindle lock engages.

The present invention provides a power tool and a spindle lock system which substantially alleviates one or more of the above-described and other problems with existing power tools and spindle locks. In some aspects, the invention provides a spindle lock including a spring element for delaying operation of the spindle lock and a detent arrangement defining a position corresponding to a run position of the power tool and a position corresponding to a locked position of the spindle lock. In one rotational direction (i.e., the forward direction), a projection is positioned in first recess to provide an unlocked position and in a second recess to provide the locked position. In the opposite rotational direction (i.e., the reverse direction), the projection is positioned in the second recess to provide the unlocked position and in the first recess to provide the locked position.

In some aspects, the invention provides a spindle lock including a spring element which applies substantially equal spring force to delay the operation of the spindle lock when the spindle is rotated in the forward direction or in the reverse direction. In some aspects, the invention provides two spring members which cooperate to apply the substantially equal force to delay the operation of the spindle lock when the spindle is rotated in the forward direction or in the reverse direction.

In some aspects, the spindle lock is a wedge roller type spindle lock. In some aspects, the invention provides a spindle lock including a synchronization member for synchronizing the engagement of the locking members and the locking surfaces of the spindle lock. In some aspects, the invention provides a spindle lock having an aligning member for aligning the axis of the wedge roller with the axis of the spindle and maintaining such an alignment. In some aspects, the invention provides a battery-powered tool including a spindle lock.

One independent advantage of the present invention is that stopping of the motor and automatic locking of the spindle can be done quietly without producing the impact or "clunk" accompanied by the sudden engagement of the spindle lock. The resilient force of the spring element of the spindle rotation controlling structure buffers and controls the rotation of the spindle caused by the inertia of the spindle (and tool holder and/or supported tool element). This resilient force also buffers and controls the inertia of the spindle when there is little or no relative rotation between the spindle and the driving engagement with the motor.

Another independent advantage of the present invention is that, even if the inertia of the spindle, tool holder and supported tool element is greater than the resilient force of the spring element of the spindle rotation controlling structure (such that the rotation of the spindle does not stop immediately upon the initial engagement of the spindle lock), the spring element buffers and controls the rotation of the spindle to dissipate the rotating energy of the spindle without the repeated impacts and rebounds or "chattering", providing a more quiet stopping of the spindle.

A further independent advantage of the present invention is that, even when the motor is braked at stopping, such as by the operation of a braking circuit or in the operation of a cordless power tool, the spindle lock and the spring element of the spindle rotation controlling structure will quietly stop the rotation of the spindle, tool holder and tool element.

Other independent features and independent advantages of the present invention will become apparent to those skilled in the art upon review of the following detailed description, claims and drawings.

Figure 1:
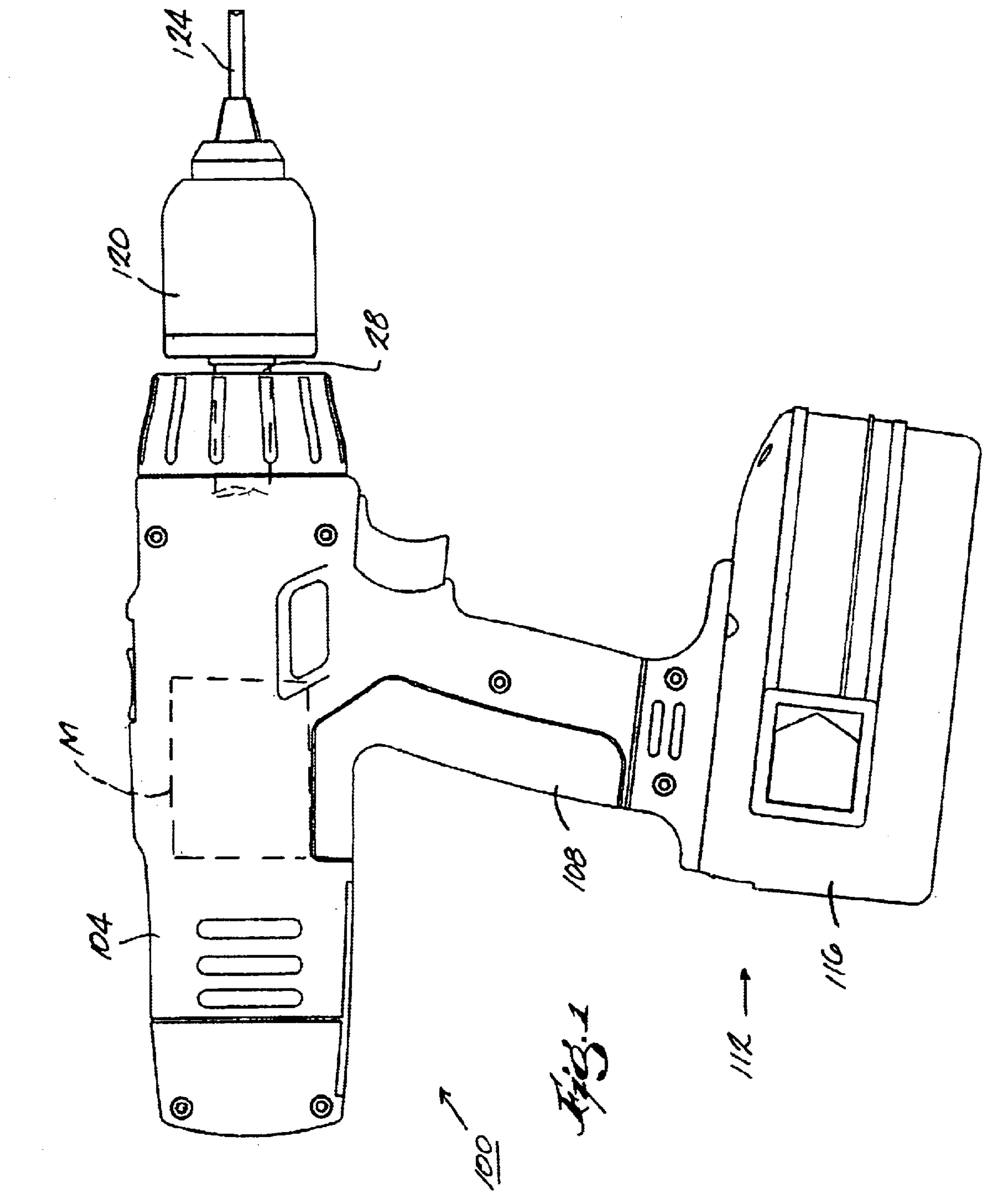
FIG. 1 is a side view of a cordless power tool including a spindle lock system embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

FIG. 1 illustrates a power tool 100 including (see FIG. 3) a spindle lock system 10 embodying the invention. As shown in FIG. 1, the power tool 100 includes a housing 104 having a handle 108 to be gripped by an operator during operation of the power tool 100. A motor M (schematically illustrated) is supported by the housing 104, and a power source 112, such as, in the illustrated construction, a battery 116, is connectable to the motor M by an electrical circuit (not shown) to selectively power the motor M.

The power tool 100 also includes a spindle 28 rotatably supported by the housing 104 and selectively driven by the motor M. A tool holder or chuck 120 is supported on the forward end of the spindle 28 for rotation with the spindle 28. A tool element, such as, for example, a drill bit 124, is supported by the chuck 120 for rotation with the chuck 120.

In the illustrated construction, the power tool 100 is a drill. It should be understood that, in other constructions (not shown), the power tool 100 may be another type of power tool, such as, for example, a screwdriver, a grinder or a router. It should also be understood that, in other constructions (not shown), the tool element may be another type of tool element, such as, for example, a screwdriver bit, a grinding wheel, a router bit or a hole saw.

Figure 2:
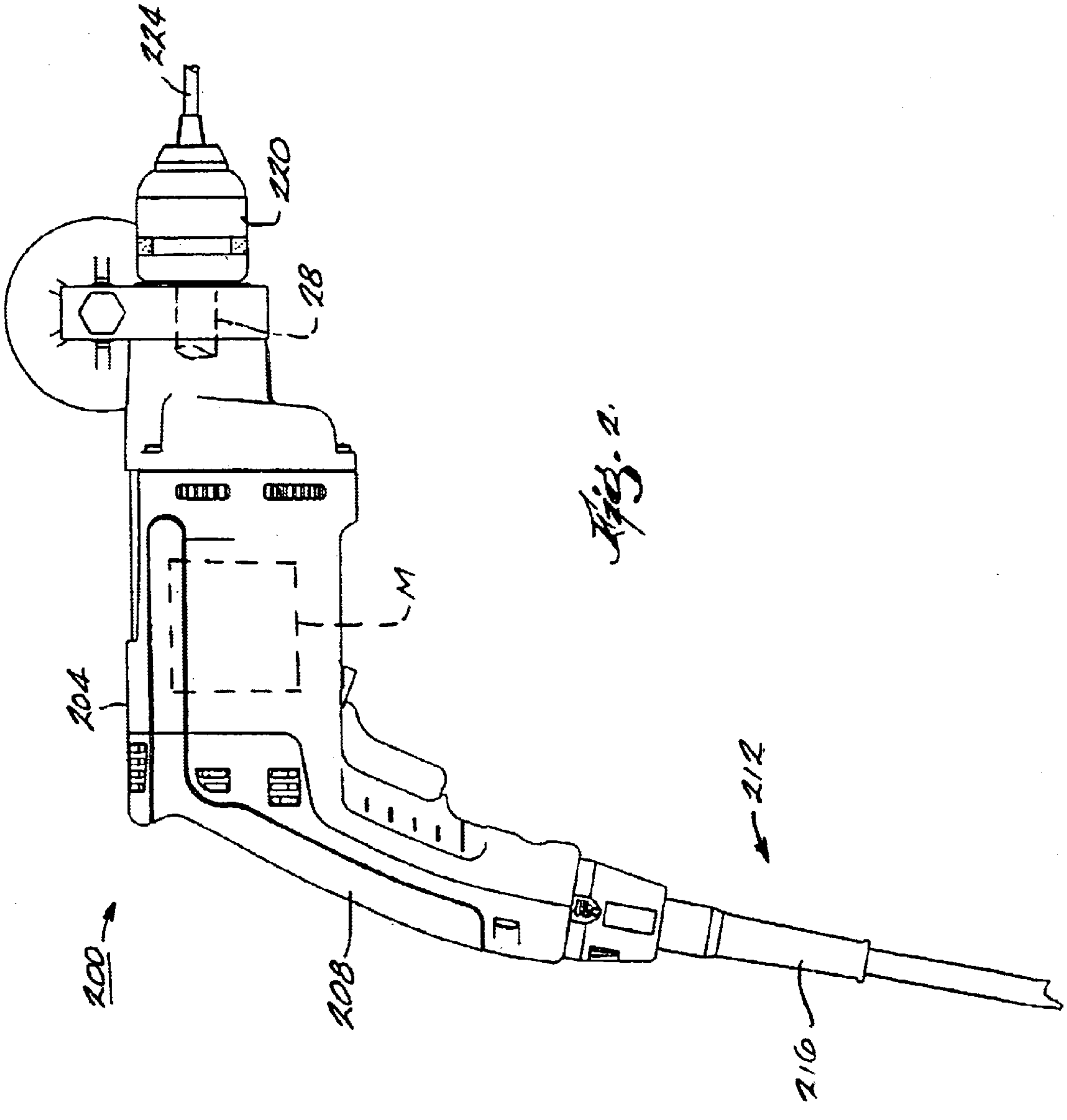
FIG. 2 is a side view of a corded power tool including a spindle lock system embodying the invention.

FIG. 2 illustrates another power tool 200 for use with the spindle lock 10. As shown in FIG. 2, the power tool 200 is a corded power tool including a housing 204 providing a handle 208 and supporting a motor M' (schematically illustrated) which is connectable to an AC power source 212 by a plug 216 to selectively power the motor M'.

Figure 3:
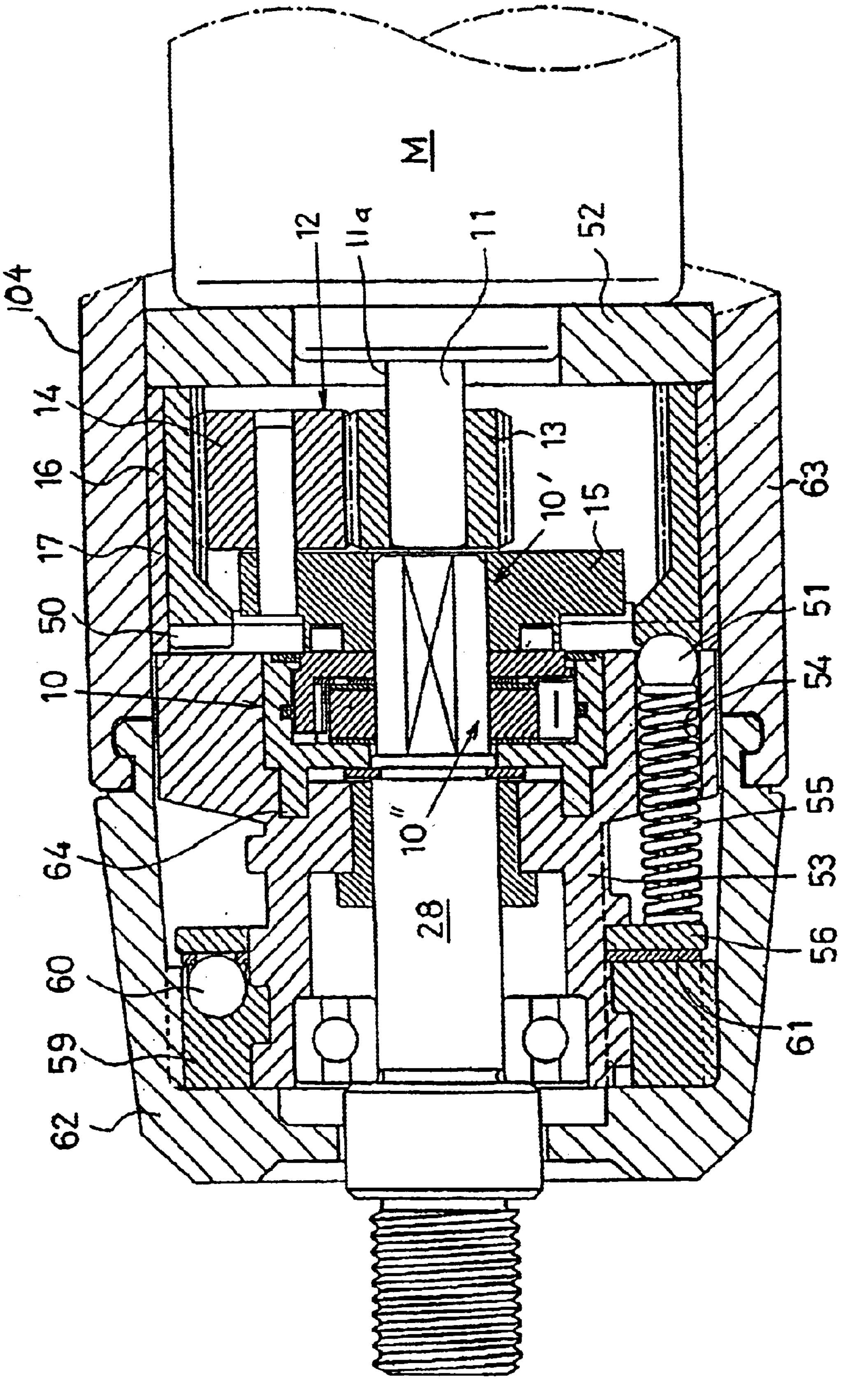
FIG. 3 is a partial cross-sectional side view of a portion of the power tool shown in FIG. 1 and illustrating the spindle lock system embodying the present invention.

As shown in FIG. 3, the motor M includes an output shaft 11*a* defining a motor axis 11 and rotatably supported by the housing 104. In the illustrated construction, the motor M is connected to a speed reduction structure 12 of a planetary gear. The speed reduction structure 12 includes a sun gear 13 connected by an attaching structure, such as splines, to the output shaft 11*a* for rotation with the output shaft 11*a*. The speed reduction structure 12 also includes a planetary gear 14 supported by a carrier 15 and engageable between the sun gear 13 and an internal gear 16. The internal gear 16 is supported by a fixing ring 17 which is supported by the housing 104. Rotation of the motor shaft 11*a* and the sun gear 13 causes rotation of the planet gear 14, and engagement of the rotating planet gear 14 with the internal gear 16 causes the planet gear 14 to revolve around the sun gear 13 and rotation of the carrier 15.

The spindle lock system 10 is supported on the outputting side of the motor M (on the outputting side of the speed reduction structure 12). The spindle lock system 10 includes a driving engagement or an output electric structure 10' for conveying the output force of the motor M, through the carrier 15 of the speed reduction structure 12, to the spindle 28. The spindle lock system 10 also includes locking structure 10" for locking the spindle 28 and selectively preventing rotation of the spindle 28 relative to the housing 104 and relative to the carrier 15 and motor M.

Figure 4:
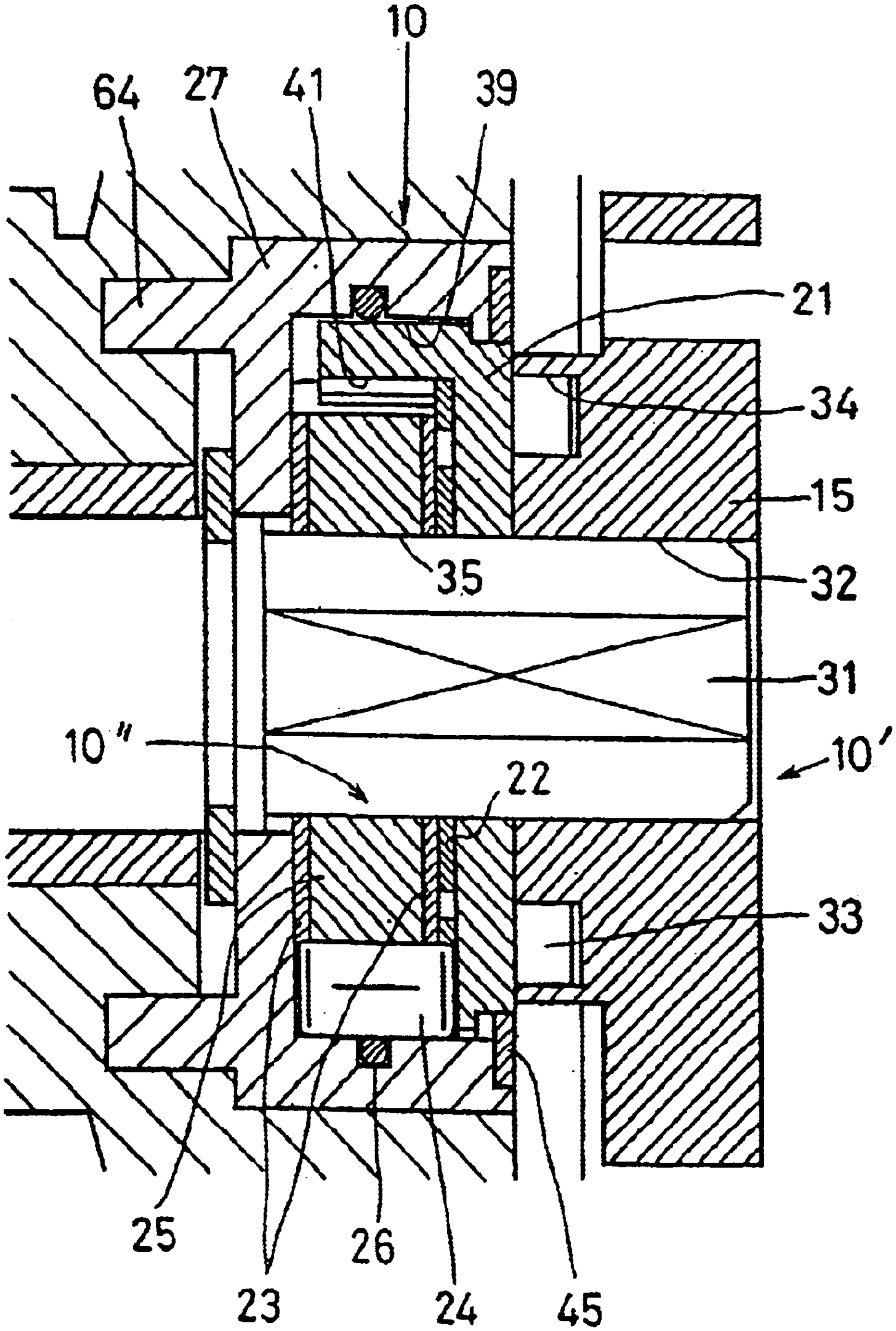
FIG. 4 is an enlarged cross-sectional side view of a portion of the spindle lock system shown in FIG. 3.
Figure 8:
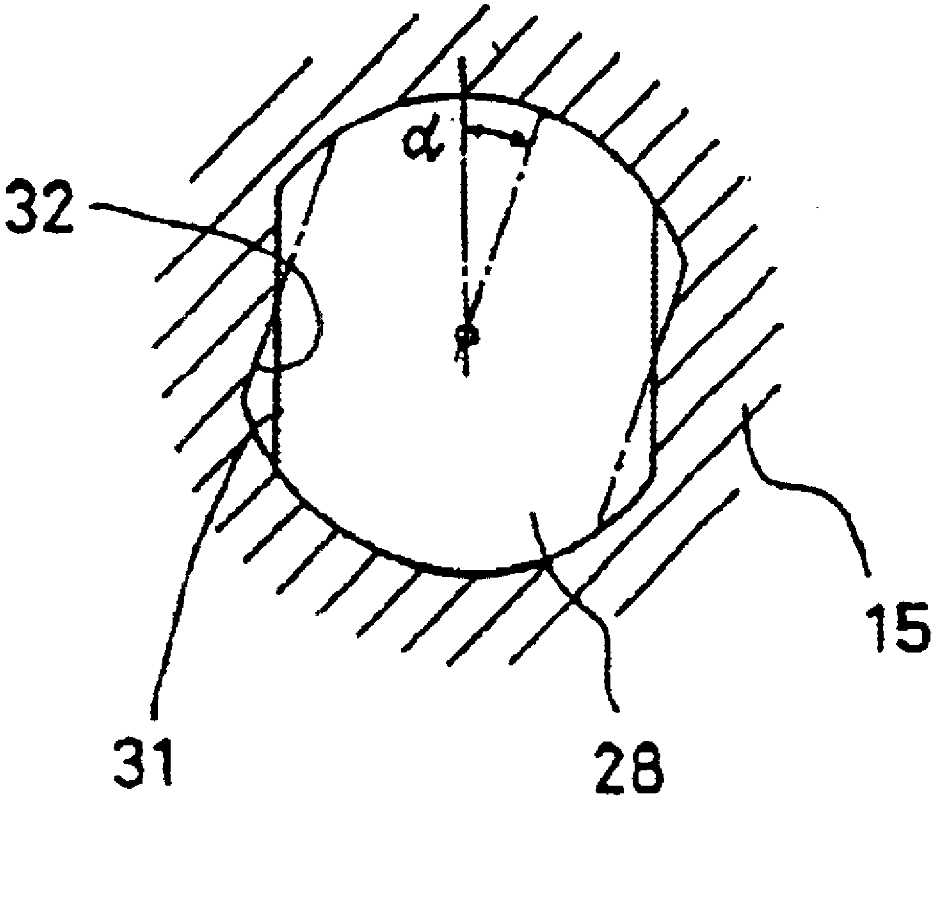
FIG. 8 is a partial cross-sectional view illustrating the connection of the spindle with the carrier.

As shown in more detail in FIGS. 4 and 8, the driving engagement 10' between the spindle 28 and the carrier 15 and motor M includes a connector 31 formed on the end of the spindle 28 (as two generally parallel planar surfaces on opposite sides of the spindle axis) and a hole-shaped connector 32 formed on the carrier 15. The connector 32 has sidewalls which are formed to provide a free angle α (of about 20 degrees in the illustrated construction) in which the spindle 28 and the carrier 15 are rotatable relative to one another to provide some rotational play between the spindle 28 and the carrier 15. When the connecting parts 31 and 32 are connected, there is a free rotational space in which the carrier 15 will not convey rotating force to the spindle 28 but in which the carrier 15 and the spindle 28 are rotatable relative to one another for the free angle α. In the illustrated construction, the shape of the connector 32 provides this free play in both rotational directions of the motor M and spindle 28.

Figures 5, 6:
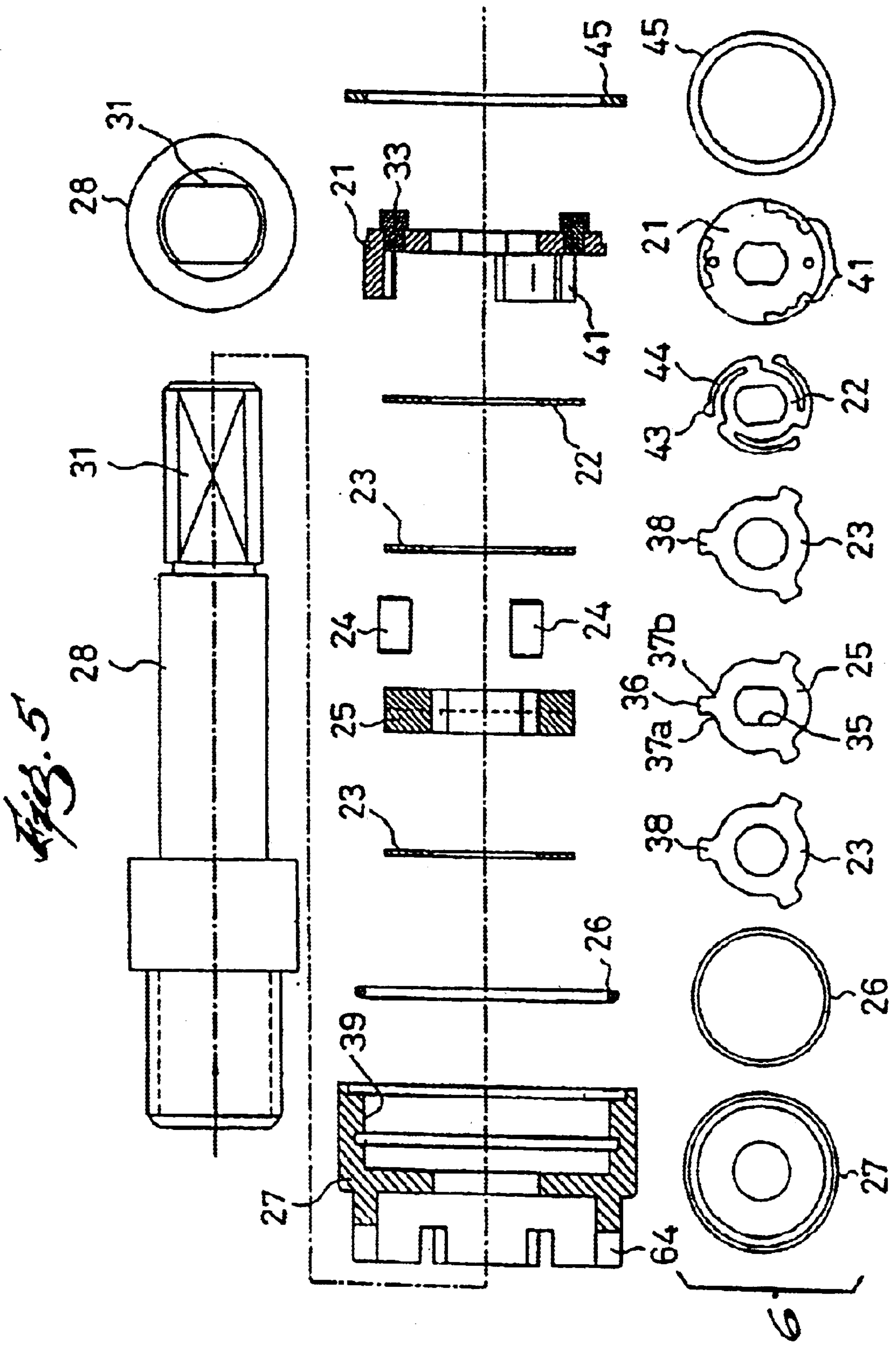
FIG. 5 is an exploded view of the components of the spindle lock system shown in FIG. 4.
FIG. 6 is a view of the components of the spindle lock system shown in FIG. 5.

As shown in FIGS. 4–6, the locking structure 10" generally includes a release ring 21, a spring or snap ring 22, two synchronizing and aligning or supporting rings 23, one or more locking members or wedge rollers 24, a lock ring 25, a rubber ring 26, a fixing ring 27 and the spindle 28. Except for the wedge rollers 24 and the spindle 28, the other components of the locking structure 10" are generally in the shape of a ring extending about the same axis, such as the axis of the spindle 28. A lid ring 45 is attached to the fixing ring 27 such that the components of the locking structure 10" are provided as a unit.

As shown in FIGS. 4–5, the release ring 21 includes pins 33 on opposite sides of the axis which are engaged and retained in connecting holes 34 formed on the carrier 15 so that the release ring 21 is fixed to and rotatable with the carrier 15. As shown in FIG. 6, the release ring 21 defines a hole-shaped connector **32*a* which is substantially identical to the connector 32 formed in the carrier 15 to provide the free rotational angle α between the spindle 28 and the carrier 15 and release ring 21**.

The lock ring 25 defines a hole-shaped connecting part 35 which is substantially identical to the connector 31 on the spindle 28 so that the lock ring 25 is fixed to and rotatable with the spindle 28 without free rotational movement. On the outer circumference, the lock ring 25 includes dividing protrusions 36 which, in the illustrated construction, are equally spaced from each other by about 120 degrees. On each circumferential side of each protrusion 36, inclined locking wedge surfaces **37*a* and 37*b* are defined to provide locking surfaces so that the spindle lock system 10 will lock the spindle 28 in the forward and reverse rotational directions. The wedge surfaces 37*a* and 37*b* are inclined toward the associated protrusion 36**.

In the illustrated construction, the locking members are wedge rollers 24 formed in the shape of a cylinder. A wedge roller 24 is provided for each locking wedge surface **37*a* and 37*b* of the lock ring 25. The wedge rollers 24 are provided in three pairs, one for each protrusion 36. One wedge roller 24 in each pair provides a locking member in the forward rotational direction of the spindle 28, and the other wedge roller 24 in the pair provides a locking member in the reverse rotational direction of the spindle 28. In the illustrated construction, the length of each wedge roller 24 is greater than the width or thickness of the lock ring 25, and the opposite ends of each wedge roller are supported by respective supporting rings 23**.

On the outer circumference of each supporting ring 23, supporting protrusions 38 are formed. In the illustrated construction, the supporting protrusions 38 are equally separated by about 120 degrees, and on each side of each supporting protrusion 38, a wedge roller 24 is supported. As shown in FIG. 6, the central opening of each supporting ring 23 is generally circular so that the supporting rings 23 are rotatable relative to the spindle 28.

The rubber ring 26 is supported in a groove in the fixing ring 27, and engagement of the wedge rollers 24 with the rubber ring 26 causes rotation of the wedge rollers 24 due to the friction between the wedge rollers 24 and the rubber ring 26. The fixing ring 27 defines an inner circumference or cavity 39 receiving the lock ring 25 and the supporting rings 23. The inner circumference 39 of the fixing ring 27 and the outer circumference of the lock ring 25 (and/or of the spindle 28) face each other in a radial direction and are spaced a given radial distance such that a pair of wedge rollers 24 are placed between a pair of inclined locking wedge surfaces **37*a* and 37*b* of the lock ring 25 and the inner circumference 39**.

The inclined locking wedge surfaces **37*a* and 37*b* and the inner circumference 39 of the fixing ring 27 cooperate to wedge the wedge rollers 24 in place in a locked position which corresponds to a locked condition of the spindle lock system 10, in which the spindle 28 is prevented from rotating relative to the housing 104 and relative to the motor M and carrier 15. Space is provided between the inner circumference 39 of the fixing ring 27 and the outer circumference of the lock ring 25 to allow the wedge rollers to move to a releasing or unlocked position which corresponds to an unlocked condition of the spindle lock system 10, in which the spindle 28 is free to rotate relative to the housing 104. In addition, the supporting protrusions 38 of the supporting rings 23 have a circumferential dimension allowing the wedge rollers 24** to be supported in the releasing or unlocked position.

The releasing ring 21 includes releasing protrusions 41 which are selectively engageable with the wedge rollers 24 to release or unlock the wedge rollers 24 from the locked position. The releasing protrusions 41 are formed on the forward side of the releasing ring 21 and, in the illustrated construction, are equally separated by about 120 degrees to correspond with the relative position of the three pairs of wedge rollers 24. Each releasing protrusion 41 is designed to release or unlock the associated wedge rollers 24 by engagement with the circumferential end part to force the wedge roller 24 in the direction of rotation of the releasing ring 21 (and the carrier 15 and motor M). The circumferential length of each releasing protrusion 41 is defined so that the releasing or unlocking function is accomplished within the free rotational angle α between the spindle 28 and the releasing ring 21 and the carrier 15. Preferably, the releasing or unlocking function is accomplished near the end of the free rotational angle α.

Each releasing protrusion 41 defines one portion of a detent arrangement or controlling structure for controlling the resilient force of the snap ring 22 between a detent position corresponding to an unlocked condition of the spindle lock system 10 and a detent position corresponding to the locked condition of the spindle lock system 10. In the illustrated construction, controlling concave recesses 42*a* and 42*b* are defined on the radially inward face of each releasing protrusion 41.

Figure 7:
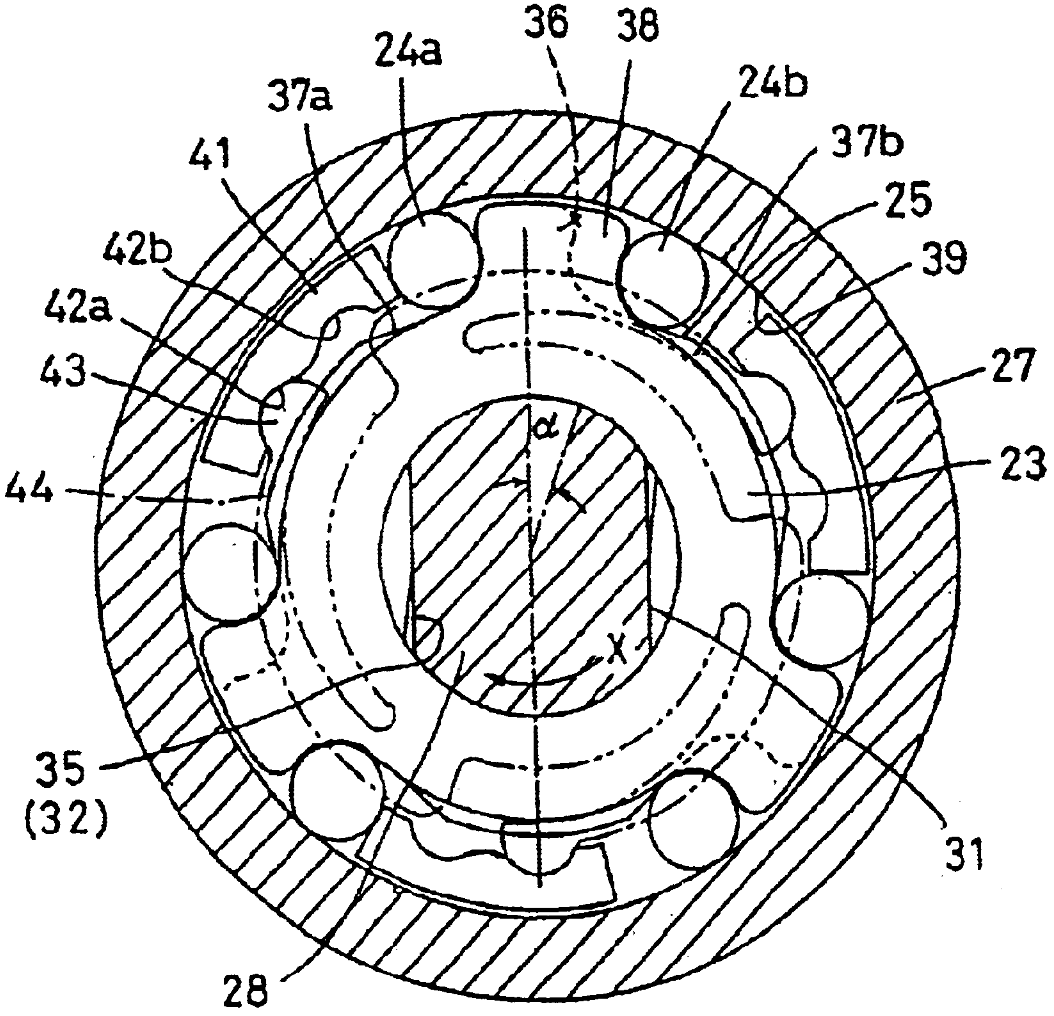
FIG. 7 is a partial cross-sectional view of components of the spindle lock system.

As shown in FIGS. 6–7, the snap ring 22 includes spring or snap arms 44 each having a controlling convex projection 43 formed at its free end. The projections 43 provide the other portion of the detent arrangement and are selectively engageable in one of a pair of corresponding recesses 42*a* and 42*b*. The snap ring 22 provides a resilient force to bias the projections into engagement with a selected one of the recesses 42*a* and 42*b*. The snap arms 44 are formed as arcuate arms extending generally in the same direction about the circumference from three equally separated positions on the body of the snap ring 22. The snap arms 44 are formed so that the projections 43 are selectively positionable in the associated recesses 42*a* and 42*b*. The resilient spring force on the projections 43 is provided by the elasticity and material characteristics of the snap arms 44.

The resilient force of the snap ring 22 is smaller than the drive force of the motor M and will allow the projections to move from one recess (i.e., recess 42*b*) to the other recess (i.e., recess 42*a*), when the motor M is restarted. As shown in FIG. 6, the central opening of the snap ring 22 is substantially identical to the connector 31 of the spindle 28 so that the snap ring 22 is fixed to and rotates with the spindle 28. The resilient force the snap arms 44 apply to the projections 43 is set to allow the projection 43 to move from one recess (i.e., recess 42*a*) to the other recess (i.e., recess 42*b*) to control and buffer the rotational force of the spindle 28 when the motor M is stopped and to delay the engagement of the locking structure 10".

Figure 9:
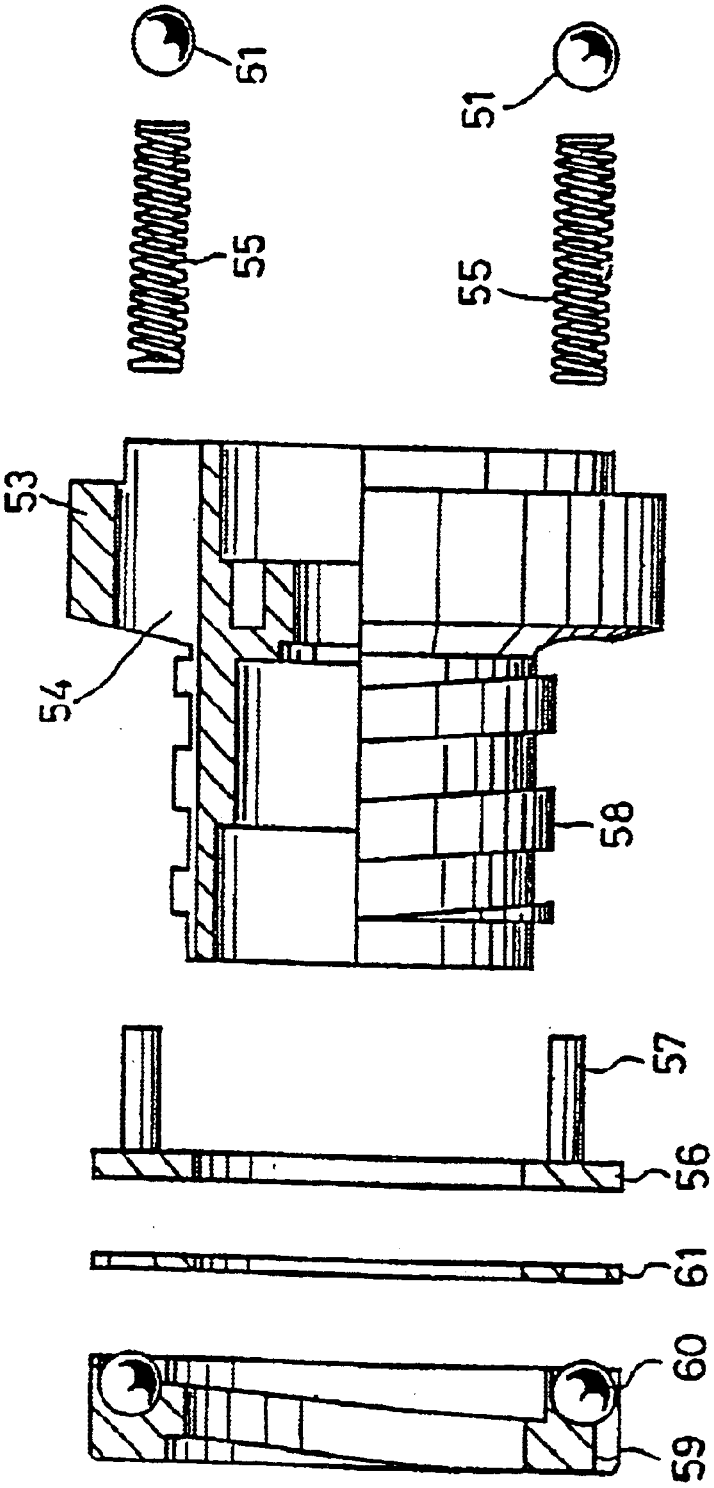
FIG. 9 is an exploded partial cross-sectional side view of a torque limiter.

As shown in FIGS. 3 and 9, the speed reduction structure 12 is provided with a torque limiter. The internal gear 16 is supported to allow rotation relative to the fixing ring 17. The forward end of the internal gear 16 provides an annular surface 50. Balls 51 are pressed against the surface 50, and the internal gear 16 is pressed against a fixing plate 52 to prevent the internal gear 16 from rotating.

A plurality of balls 51 (six in the illustrated construction) are positioned about the circumference of the internal gear 16 in engagement with the surface 50. A fixing element 53 defines a hole 54 for each ball 51 and received the ball 51 and a biasing spring 55. The spring 55 presses the ball 51 against the surface 50 of the internal gear 16 so that the internal gear 16 is pressed against the fixing plate 52. A receiving element includes supporting pins 57 which support the respective springs 55.

The forward end of the fixing element 53 is formed with a screw 58. A nut 59 engages the screw thread 58 and axially moves, through the ball 60 and ring 61, the receiving element towards and away from the internal gear 16 to adjust the spring force applied by the springs 55 to the balls 51 and to the surface 50 of the internal gear 16. The nut 59 is connected to an operating cover 62 by a spline attachment, and rotation of the operating cover 62 causes rotation and axial movement of the nut 59.

The fixing ring 27 is fixed to the fixing element 53 through a retaining part 64 to prevent rotation of the fixing ring 27. Alternatively, the retaining part 64 may be formed in the shape of a pin to be inserted into a hole in the fixing element 53. The fixing plate 52, the fixing ring 17 and the fixing element 53 are fixed to the outer case 63 of the housing 104.

In operation, when the carrier 15 and the releasing ring 21 are rotated in the direction of arrow X (in FIG. 7) by operation of the motor M, the corresponding wedge roller 24*a* is pushed into a releasing or unlocked position of the inclined surface 37*a* of the lock ring 25 by the end of the releasing protrusion 41. The other wedge roller 24*b* is kept in contact with the inner circumference 39 of the fixing ring 27, and, by its frictional contact, the wedge roller 24*b* is pushed into the releasing position of the inclined surface 37*b*. This releasing or unlocking function is accomplished within the free rotational angle α between the spindle 28 and the carrier 15 and the motor M.

After the locking structure 10" is released or unlocked, the connecting part 32 of the carrier 15 and the connecting part 31 of the spindle 28 move into driving engagement so that the driving force of the carrier 15 (and motor M) is transferred to the spindle 28 and the spindle 28 rotates with the carrier 15. At this time, each projection 43 of each snap arm 44 is positioned in one recess (i.e., recess 42*a*, the "run" position recess) of each releasing protrusion 41, and the position of the releasing ring 21 and the lock ring 25 is controlled by the resilient force of the snap arms 44 in a releasing or unlocked position at one end of the free angle α.

During driving operation of the motor M, the releasing protrusion 41 provides a force necessary to push the wedge roller 24*a* into the releasing or unlocked position and does not provide a large impact force on the wedge rollers 24*a*. When the motor M is stopped (switched from the operating condition to the non-operating condition) rotation of the carrier 15 is stopped. Rotation of the spindle 28 is controlled and buffered by the resilient force of the snap arms 44 retaining the projection 43 in the selected recess (i.e., recess 42*a*). During stopping, if the inertia of the spindle 28 (and the chuck 120 and/or the supported bit 124) is less than the resilient force of the snap arms 44, rotation of the spindle 28 is stopped with the projections 43 being retained in the selected recess (i.e., recess 42*a*, the run position). In such a case, the resilient force of the snap ring 22 buffers and controls the inertia of the spindle 28 even when there is little or no relative rotation between the spindle 28 and the carrier 15 and the motor M.

When the inertia of the spindle 28 (and the chuck 120 and/or the bit 124) is greater than the resilient force of the snap arms 44, the inertia overcomes the resilient force of the snap arms 44 and the friction between the projections 43 and the inclined ramp surface adjacent to the selected recess 42*a* so that the projections 43 move from the recess 42*a* and to the other recess 42*b* (the "lock" position recess). Movement of the projections 43 from recess 42*a* and to the recess 42*b* resists the rotational inertia of the spindle 28 and controls and buffers the rotational inertia of the spindle 28 so that the rotation of the spindle 28 will be dissipated before the locking structure 10" engages.

Therefore, the rotational inertia of the spindle 28 (and the chuck 120 and/or bit 124) is controlled and buffered by the engagement of the projections 43 in the respective recesses 42*a* and movement to the recesses 42*b* under the resilient spring force applied the respective snap arms 44. The snap ring 22 controls the rotational force of the spindle 28 and delays the engagement of the wedge rollers 24 and the locking wedge surfaces 37 so that there is no impact in the components of the spindle lock system 10, and no noise (no big "clunk") is created when the rotation of the spindle 28 has stopped. Also, because the rotational force of the spindle 28 is controlled, there is no impact of the spindle lock and rebound through the free rotational angle α so that the "chattering" phenomenon is also avoided. The rotational control device of the spindle lock system 10 includes the detent arrangement provided by the recesses 42$a$ and 42$b$ and the projections 43 and the resilient spring force provided by the snap arms 44 of the snap ring 22.

When the operator operates the chuck 120 (which tends to rotate the spindle 28 relative to the carrier 15 and motor M), rotation of the spindle 28 will be prevented because of the functioning of the locking structure 10". When the operator attempts to rotate the spindle 28 (i.e., by operating the chuck 120), the wedge rollers 24 will be wedged between the inner circumference 39 of the fixing ring 27 and the respective inclined locking wedge surfaces 37$a$ and 37$b$ of the lock ring 25 so that rotation of the spindle 28 in each rotational direction will be prevented. Because the spindle 28 is prevented from rotating, the chuck 120 can be easily operated to remove and/or support the bit 124.

When the motor M is restarted (switched from the non-operating condition to the operating condition, the end of the releasing protrusion 41 (in the selected rotational direction) moves one wedge roller 24$a$ to a releasing position. The other wedge roller 24$b$ engages the inner circumference 39 of the fixing ring 27 and is pushed into a releasing position. Once the wedge rollers 24 are released, the spindle 28 is free to rotate. The spindle 28 begins to rotate under the force of the motor M at the end of the free angle $\alpha$ of rotation between the spindle 28 and the carrier 15 and motor M.

When the spindle 28 is driven and the wedge rollers 24 rotate about their respective axes and revolve about the spindle 28, the wedge rollers 24 are kept in contact with the rubber ring 26, and this contact resistance causes the wedge rollers 24 to rotate while revolving. This rotation of the wedge rollers 24 and engagement with the supporting protrusions 38 of the supporting rings 23 on a trailing portion of the respective wedge rollers 24 maintains the respective axes of the wedge rollers 24 in an orientation in which the roller axes are substantially parallel to the axis of the spindle 28.

Engagement of the supporting protrusions 38 of the supporting rings 23 with the trailing portion of the respective wedge rollers 24 during movement of the wedge rollers 24 from the unlocked position toward the locked position prevents the wedge rollers 24 from becoming misaligned. Preferably, the supporting protrusions 38 engage the trailing portion of the respective wedge rollers 24 from the unlocked position, to the locked position and in the locked position.

The supporting rings 23 thus provide an aligning feature for the wedge rollers 24. Because the roller axes are aligned with the axis of the spindle 28, when the wedge rollers are wedged between the inner circumference 39 of the fixing ring and the inclined wedge surfaces 37 of the lock ring 25, a line contact is provided between the wedge rollers 24 and these locking surfaces to provide maximum locking force. The supporting rings 23 also provide a synchronizing feature of the wedge rollers 24 so that the wedge rollers 24 simultaneously move to the locking position upon engagement of the locking structure 10".

Figure 10:
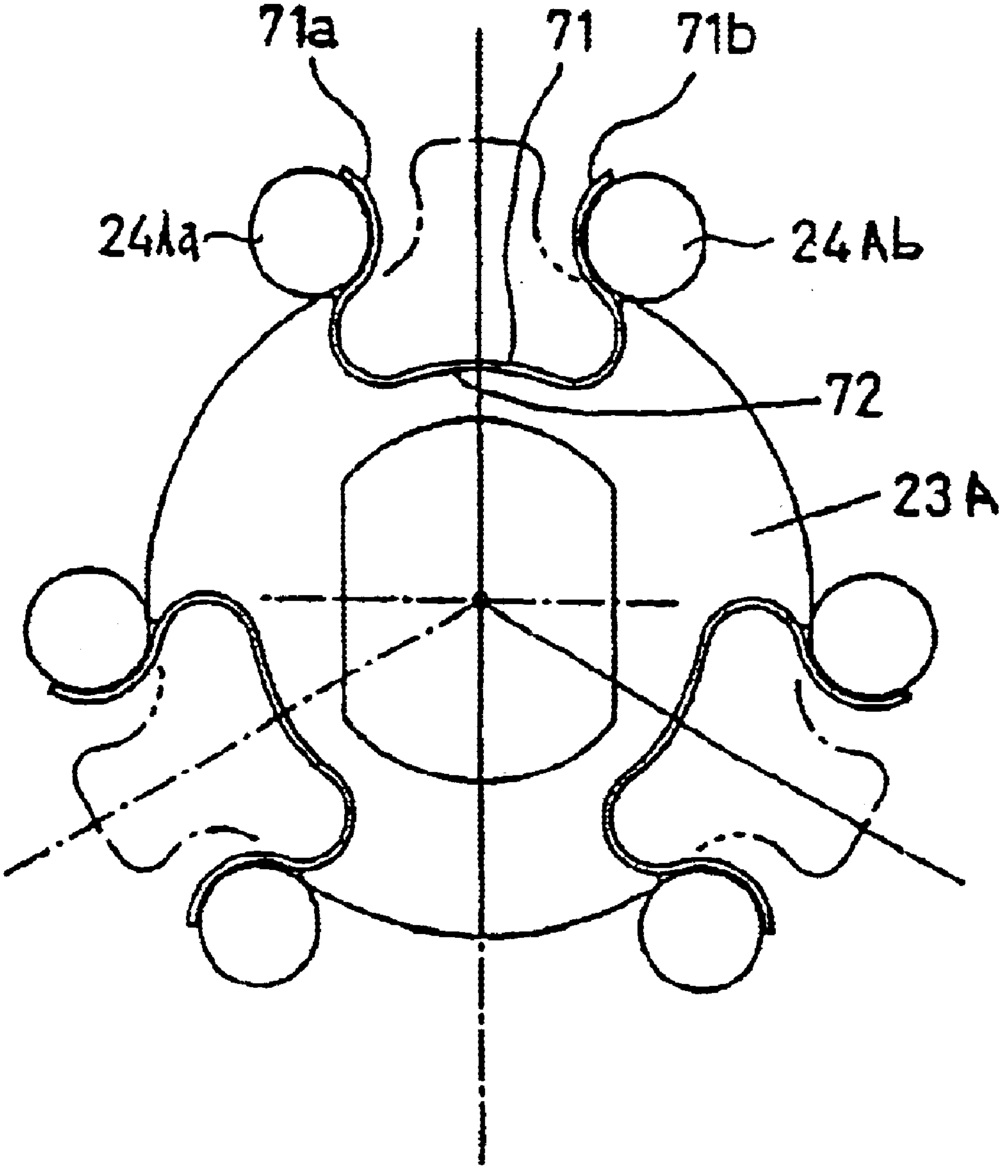
FIG. 10 is a view of a first alternative construction of the supporting ring.

FIG. 10 illustrates a first alternative construction for a supporting ring 23A. Common elements are identified by the same reference number "A".

In the earlier-described construction, the wedge rollers 24 are supported in the releasing position by the supporting protrusions 38 of the supporting ring 23. In the first alternative construction (shown in FIG. 10), the wedge rollers 24A are supported by concave parts 71$a$ and 71$b$ of an elastic material 71. Preferably, the elastic material 71 is formed of a flexible elastic material such as a spring material. A concave base 72 connects the parts 71$a$ and 71$b$ and is connected to the supporting ring 23A.

In the position shown in FIG. 10, the wedge rollers 24A are supported in a releasing position in close proximity to the locked position of each wedge roller 24A. The elastic member 71 supports the wedge rollers 24A with flexibility so that the wedge rollers 24A may flex the concave parts 71$a$ and 71$b$ to move towards a further released position. When the releasing protrusion 41A engages the wedge rollers 24A to release or unlock the wedge rollers 24A, the flexible elastic member 71 attenuates any resulting shock.

During driving of the spindle 28A, the leading concave parts 71$a$ or 71$b$ (depending on the driving direction of the spindle 28A) are compressed so that the trailing portion of the respective leading wedge rollers 24A are engaged by the respective concave parts 71$a$ or 71$b$ and by the dividing protrusions 36A on the lock ring 25A. When the motor M is stopped, the concave parts 71$a$ or 71$b$ expand and cause an initial locking engagement with the respective wedge rollers 24A. The expanding concave parts 71$a$ or 71$b$ also maintain engagement with the trailing portion of the respective wedge rollers 24A as the wedge rollers 24A move from the unlocked position toward the locked position. Preferably, the concave parts 71$a$ or 71$b$ maintain engagement with the trailing portion of the respective wedge rollers 24A as the wedge rollers 24A move from the unlocked position, to the locked position and in the locked position. This engagement prevents the wedge rollers 24A from becoming misaligned.

In this construction, the center opening of the supporting ring 23A is formed with a connecting part which is substantially identical to the connecting part 31A of the spindle 28A so that the supporting ring 23A is fixed to and rotatable with the spindle 28A. However, in an alternative construction (not shown), the central opening of the supporting ring 23A may be circular.

Figure 11:
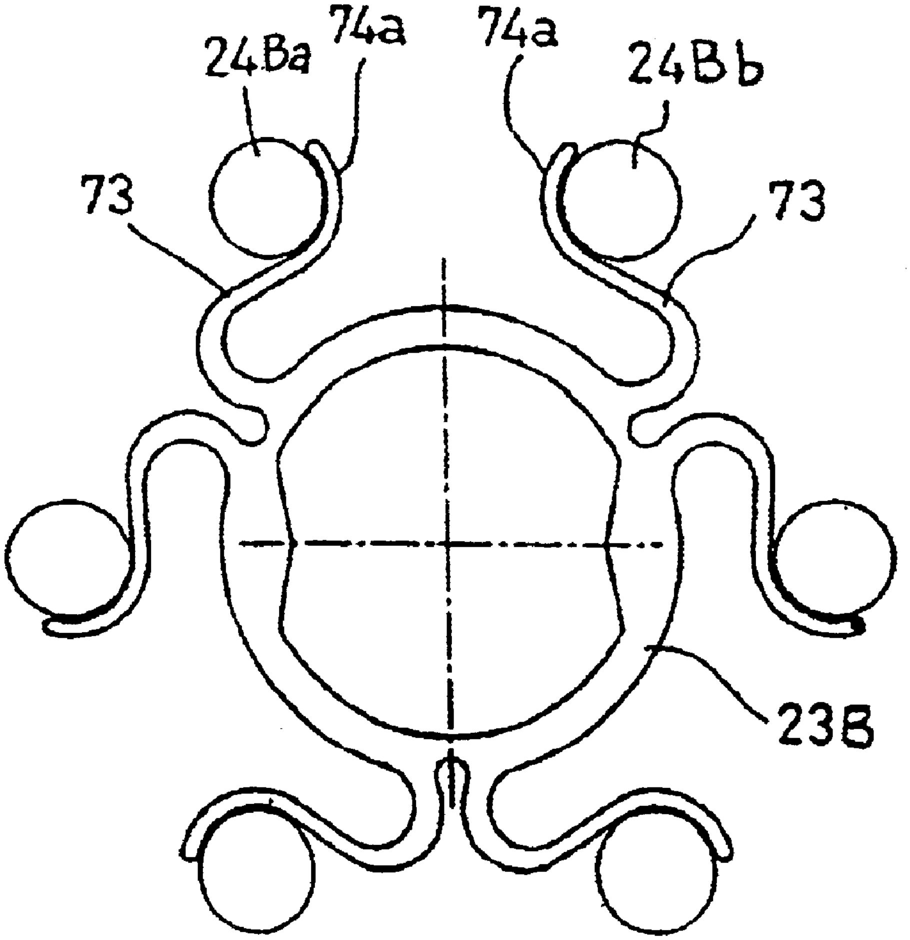
FIG. 11 is a view of a second alternative construction of the supporting ring.
Figure 12:
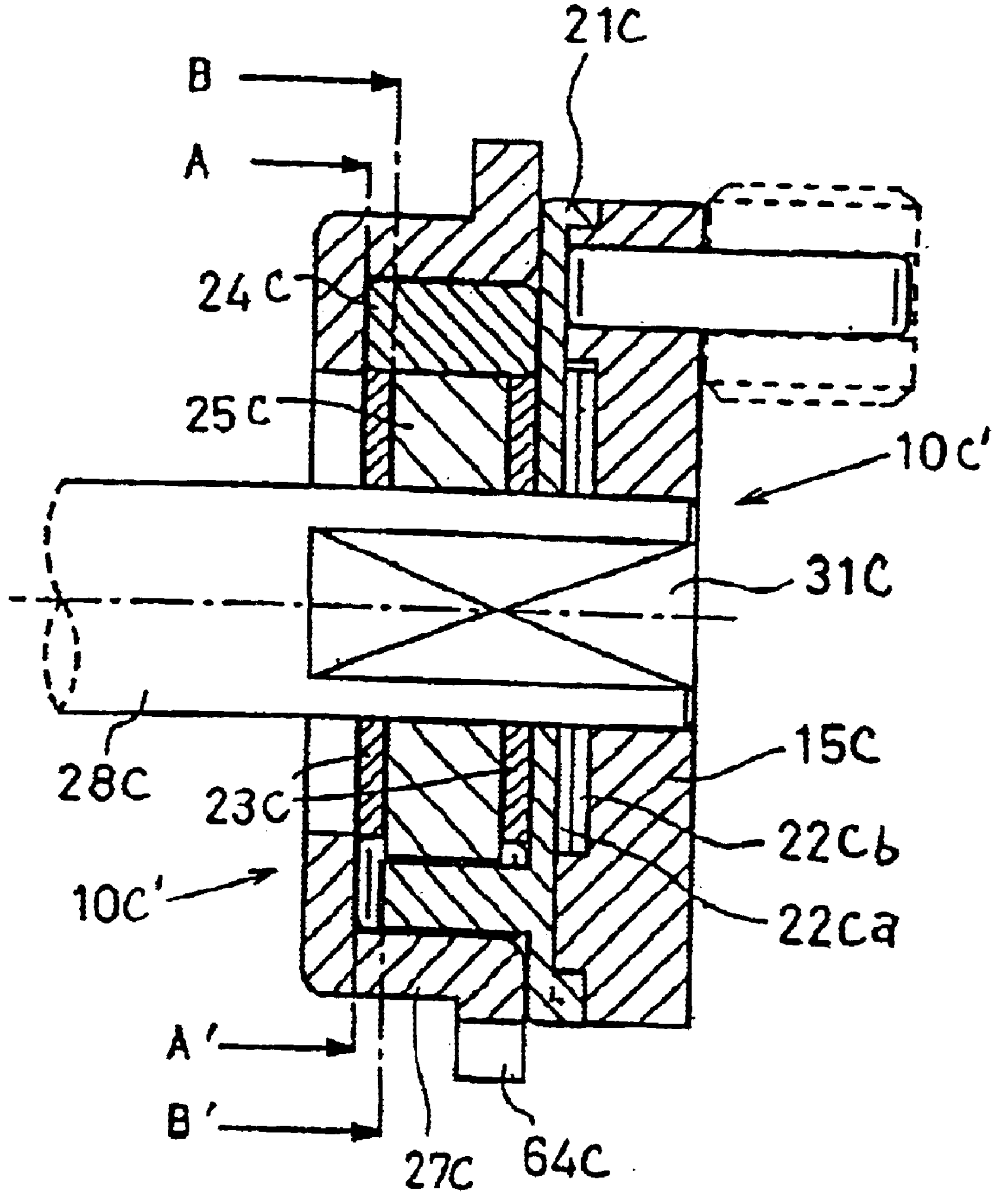
FIG. 12 is an enlarged partial cross-sectional side view of a first alternative construction of the rotation controlling structure of the spindle lock system taken generally along line C–C' in FIG. 14.

FIG. 11 illustrates a second alternative construction of a supporting ring 23B. Common elements are identified by the same reference number "B".

In the first alternative construction shown in FIG. 10, elastic material 71 was connected to the body of the supporting ring 23A. In the construction illustrated in FIG. 11, the supporting ring 23B includes arms 73 providing concave part 74$a$ and 74$b$ at their ends to provide a flexible support for the wedge rollers 24B. With the construction illustrated in FIG. 11, the supporting ring 23B with the elastic arms 73 provides the same operation as concave parts 71$a$ and 71$b$ of the supporting ring 23A illustrated in FIG. 10.

In the illustrated construction, the central opening of the supporting ring 23B is substantially identical to the connecting part 32B of the carrier 15B. As with the other supporting rings 23 and 23A, the central opening may be circular or may have the shape of the connecting part 31 of the spindle 28. In any of these constructions, the supporting ring 23, 23A and 23B may be formed of a metal plate or a synthetic resin.

FIGS. 12–15 illustrate a first alternative construction of the rotation control device of a spindle lock 10C. Common elements are identified by the same reference number "C".

As shown in FIGS. 12–15, the rotation control device includes a snap ring 22C formed by two snap ring elements 22C$a$ and 22C$b$. The snap ring elements 22C$a$ and 22C$b$ are substantially identical and are supported in a reversed orientation relative to one another to provide the snap ring 22C.

In this construction, the forward end of the carrier 15C defines the control concave recesses 42C$a$ and 42C$b$ for receiving the control convex projections 43C*a* and 43C*b* on each of the snap ring elements 22C*a* and 22C*b* to provide the controlling and buffering of the continued rotation of the spindle 28C. The forward end of the carrier 15C includes a containing recess 82 having an inner circumference 81 receiving the two snap ring elements 22C*a* and 22C*b*. The recesses 42C*a* and 42C*b* are formed at three circumferentially spaced locations which correspond to the position of the recesses 42*a* and 42*b* in the earlier-described construction.

The snap rings 22C*a* and 22C*b* are received in the containing recess 82 to form the snap ring 22C. Each snap ring element 22C*a* and 22C*b* has a snap ring body from which respective snap arms 44C*a* and 44C*b* extend. Corresponding projections 43C*a* and 43C*b* are formed at the end of each snap arm 44C*a* and 44C*b*, respectively. In the illustrated construction, the snap ring elements 22C*a* and 22C*b* are supported so that the arms from one snap ring element (i.e., arms 44C*a* of snap ring 22C*a*) extend in one circumferential direction and the arms of the other snap ring elements (i.e., arms 44C*b* of snap ring 22C*b*) extend in the opposite circumferential direction.

The snap ring elements 22C*a* and 22C*b* are supported so that the corresponding projections 43C*a* and 43C*b* are aligned and are positioned in the same recess 42C*a* or 42C*b*. In this manner, the snap ring 22C provides the same force on the projections 43C when a force is applied to the snap ring 22C in either rotational direction by the spindle 28C. Because of the configuration of the snap ring elements 22C*a* and 22C*b*, in one rotational direction, one projection and snap arm (i.e., projection 43C*a* and snap arm 44C*a*) will apply a spring force to retain the projection 43C*a* in the selected recess, and this spring force will provide a first portion of the total spring force applied by the snap ring 22C. At the same time, the other projection and snap arm (i.e., projection 43C*b* and snap arm 44C*b*) will apply a spring force to maintain the projection 43C*b* in the selected recess, and this spring force will provide a second portion of the total force applied by the snap ring 22C.

In the opposite rotational direction, the first snap ring element 22C*a* will apply a first spring force which is a first portion of the total force applied by the snap ring 22C, and the second snap ring element 22C*b* will apply a second spring force which is a second portion of the total force applied by the snap ring 22C to control and buffer the rotation of the spindle 28C in that rotational direction. Because of the configuration of the snap ring elements 22C*a* and 22C*b*, the snap ring elements 22C*a* and 22C*b* apply a different force in each of the rotational directions when controlling and buffering the rotation of the spindle 28C. However, in each rotational direction, the snap ring 22C applies substantially the same spring force to control and buffer the rotation of the spindle 28C.

It should be understood, that in the earlier-described construction (shown in FIGS. 2–7), the snap ring 22 could include two separate snap ring elements (similar to snap ring elements 22C*a* and 22C*b*).

Figure 13:
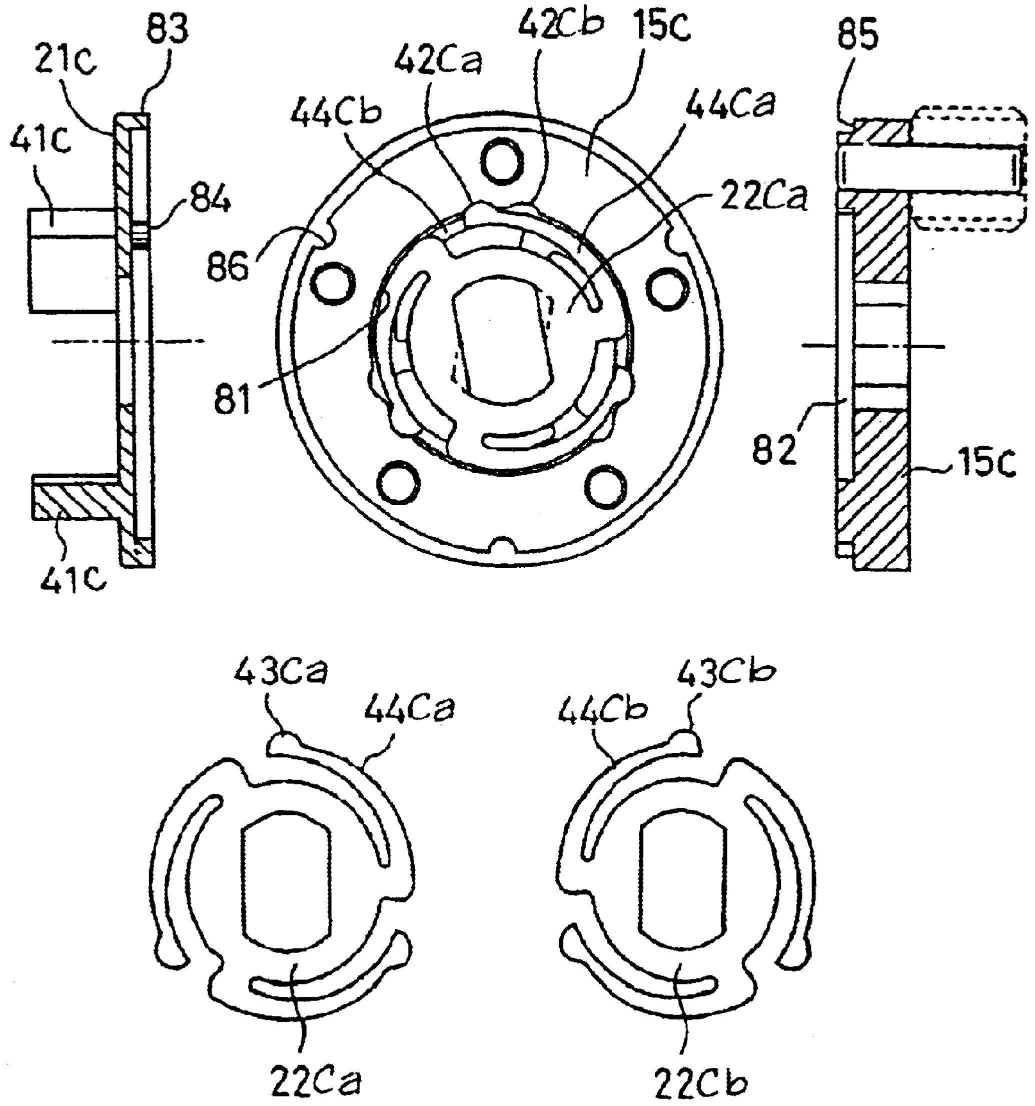
FIG. 13 is an exploded partial cross-sectional view of the rotation controlling structure shown in FIG. 12.

As shown in FIG. 13, a guard-like annular portion 83 is formed on the rear face of the releasing ring 21C, and retaining projections 84 are formed on the inner annular surface of the portion 83. A step 85 is formed on the outer circumference of the carrier 15C, and retaining recesses 86 are formed in locations about the step 85. The projections 84 and the recesses 86 engaged to fix the releasing ring 21C to the carrier 15C as a unit. The snap ring 22C and snap ring elements 22C*a* and 22C*b* are received in the space between the carrier 15C and the releasing ring 21C.

Figure 14:
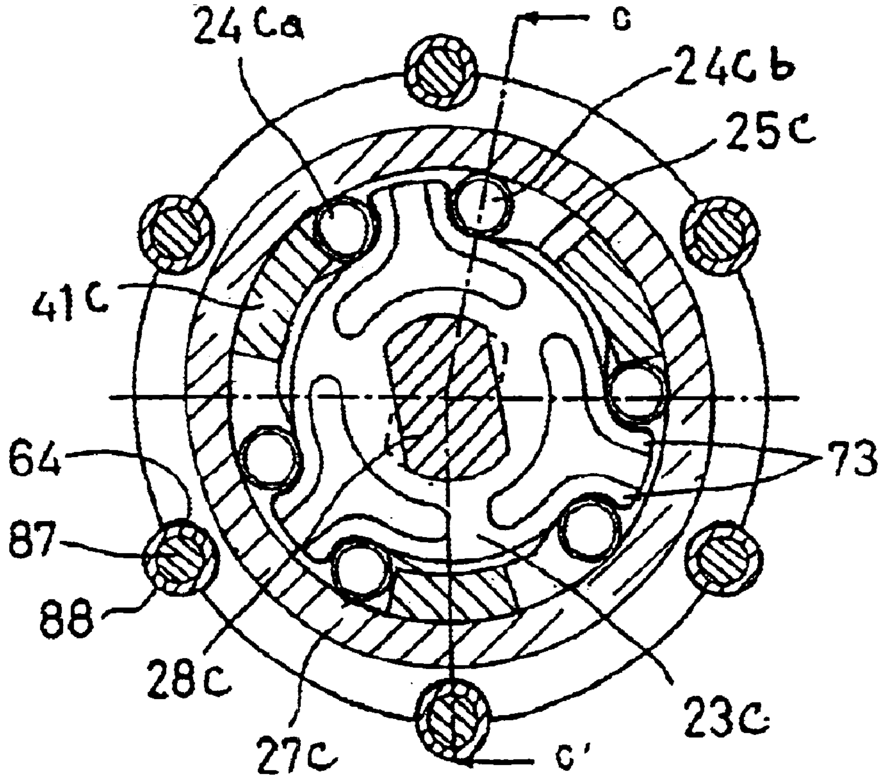
FIG. 14 is a partial cross-sectional view taken generally along line A–A' in FIG. 12.

As shown in FIG. 14, the supporting ring 23C is similar to the supporting ring 23B and includes elastic arms 73C to support the wedge rollers 24C (maintaining their alignment and synchronizing their locking action).

As also shown in FIG. 14, the fixing ring 27C defines retaining recesses 64C which receive pins 87 connected to the fixing element 53C to connect the fixing ring 27C to the fixing element 53C. Elastic material 88 is positioned between the recesses 64C and the pins 87 to absorb any impact caused by the spindle lock 10C engaging and preventing such an impact from being transferred from the fixing ring 27C and to the fixing element 53C. The elastic material 88 can be any type of rubber or elastic material to absorb an impact.

Figure 15:
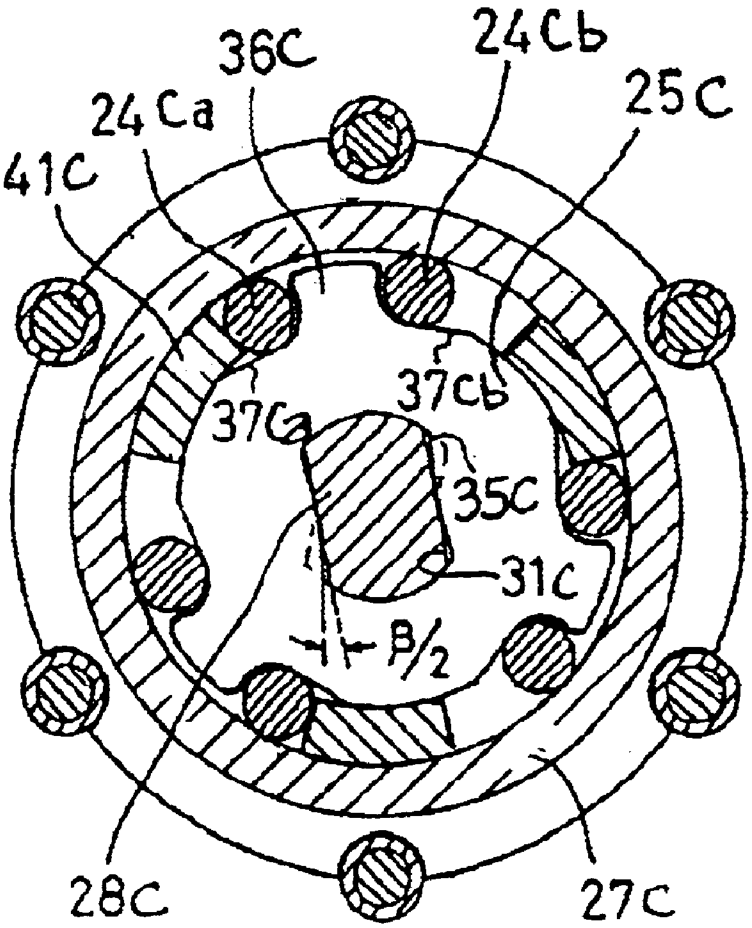
FIG. 15 is a partial cross-sectional view taken along line B–B' in FIG. 12.

As shown in FIG. 15, the connecting part 35C of the lock ring 25C and the connecting part 31C of the spindle 28C are formed such that there is a free rotational angle β between the connecting part 31C of the spindle 28C and the connecting part 35C of the locking ring 25C. In the illustrated construction, this free rotational angle β is smaller (i.e., an angle of about 10 degrees) than the free rotational angle U (an angle of about 20 degrees) between the connecting part 32C of the carrier 15C and the connecting part 31C of the spindle 28C. The free rotational angle β allows the locking ring 25C to be easily connected to the spindle 28 while maintaining the proper operation of the spindle lock 10C.

Figure 16:
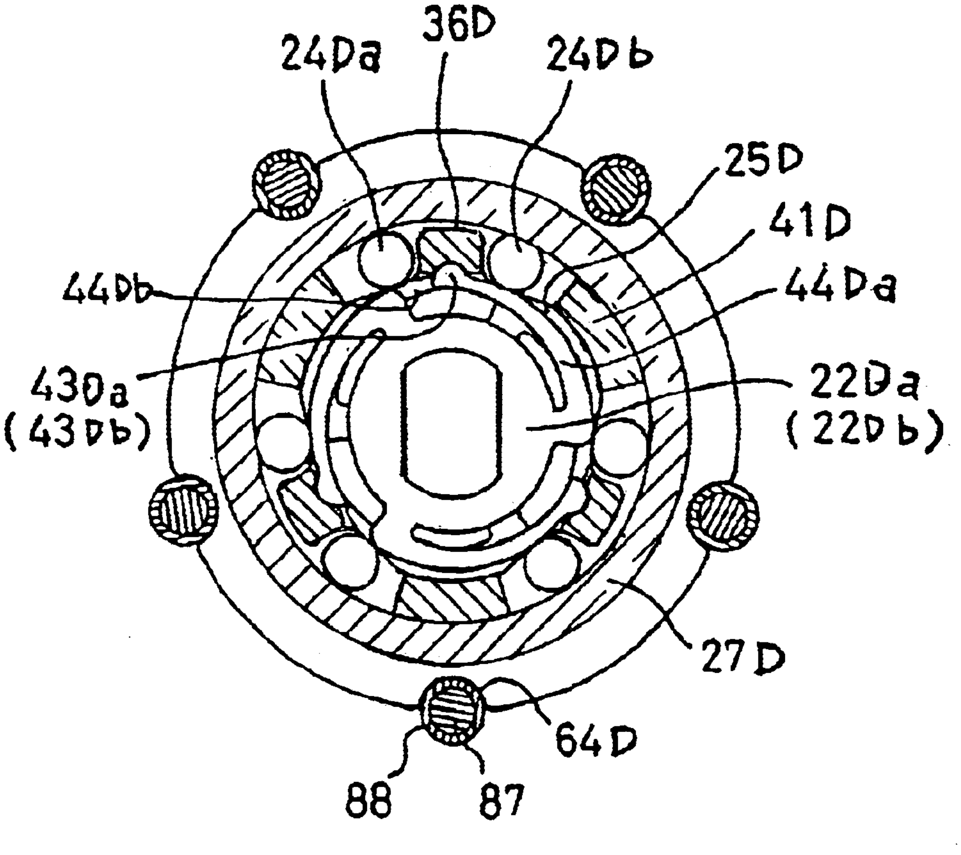
FIG. 16 is a partial cross-sectional view of a second alternative construction of the rotation controlling structure of the spindle lock system.
Figure 17:
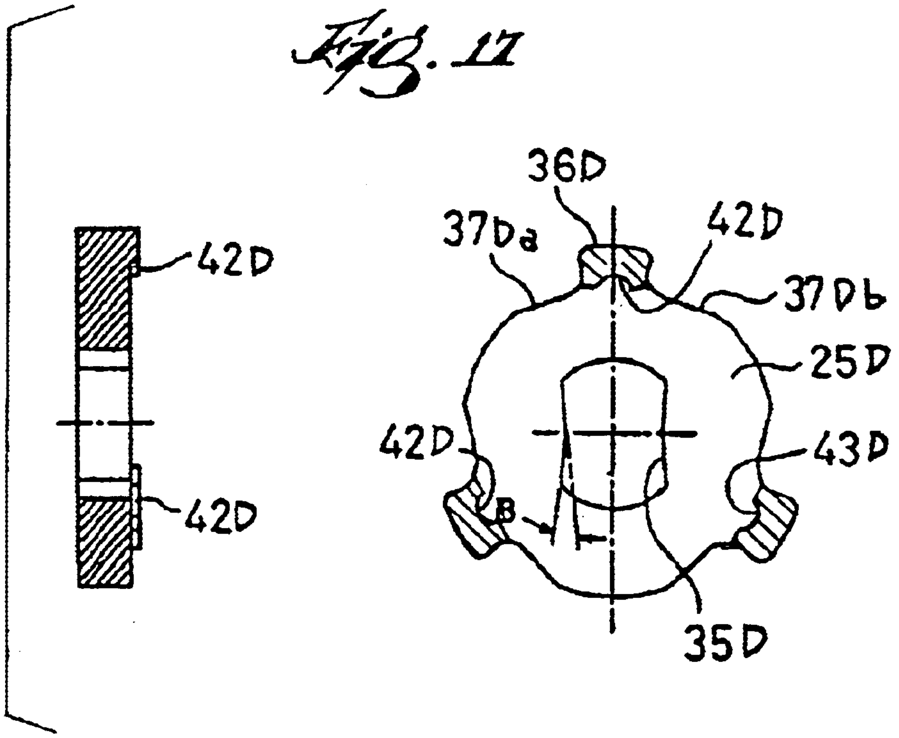
FIG. 17 are partial cross-sectional views of a portion of the spindle lock system shown in FIG. 16.

FIGS. 16–17 show a second alternative construction of the rotation controlling structure of a spindle lock 10D. Common elements are identified by the same reference number "D".

In the illustrated construction, the rotational control structure includes a single recess 42D for each projection 43C (rather than the two recesses 42*a* and 42*b* of earlier-described constructions). Each recess 42D is formed in a location corresponding to an unlocked position of the wedge rollers 24D. As shown in more detail in FIG. 17, the recesses 42D are formed on the dividing protrusion 36D of the locking ring 25D. In this construction, the snap ring 22D includes two snap ring elements 22D*a* and 22D*b* supported in reversed orientations, and the snap ring 22D (formed of snap ring elements 22D*a* and 22D*b*) engages the locking ring 25D.

In operation, when the spindle 28D is rotated relative to the driving engagement (the connection between the spindle 28D and the carrier 15D), the continued rotation of the spindle 28D causes the projections 43D to move from the recesses 42D. The resilient force applied by the snap arms 44D and this movement delays the engagement of the wedge rollers 24D with the wedge surfaces defined by the locking ring 25D and the fixing ring 27D.

The snap ring 22D controls and buffers the movement of the spindle 28D and delays the movement of the wedge rollers 24D and the locking ring 25D to the locked position. In this construction, when the motor M is stopped and the spindle 28D continues its rotation under inertia, the locking ring 25D operates the wedge rollers 24D (in the selected rotational direction) to lock the rotation of the spindle 28D. The inertia of the spindle 28D is controlled and buffered by the resilient force of the snap arms 44D*a* and 44D*b* so that there is no impact or "clunk" caused by a sudden stop when the spindle lock 10D is engaged. Therefore, the spindle lock 10D provides a quiet stop of the rotation of the spindle 28D. Even if the inertia of the spindle 28D is larger than can be buffered by the resilient force of the snap ring 22D, the rotation of the spindle 28D is stopped at an early stage so that there is no rebounding of the spindle 28D and no "chattering".

In this construction, the connecting part 35D of the locking ring 25D and the connecting part 31D of the spindle 28D also include a free rotational angle β, similar to that described above.

Figure 18:
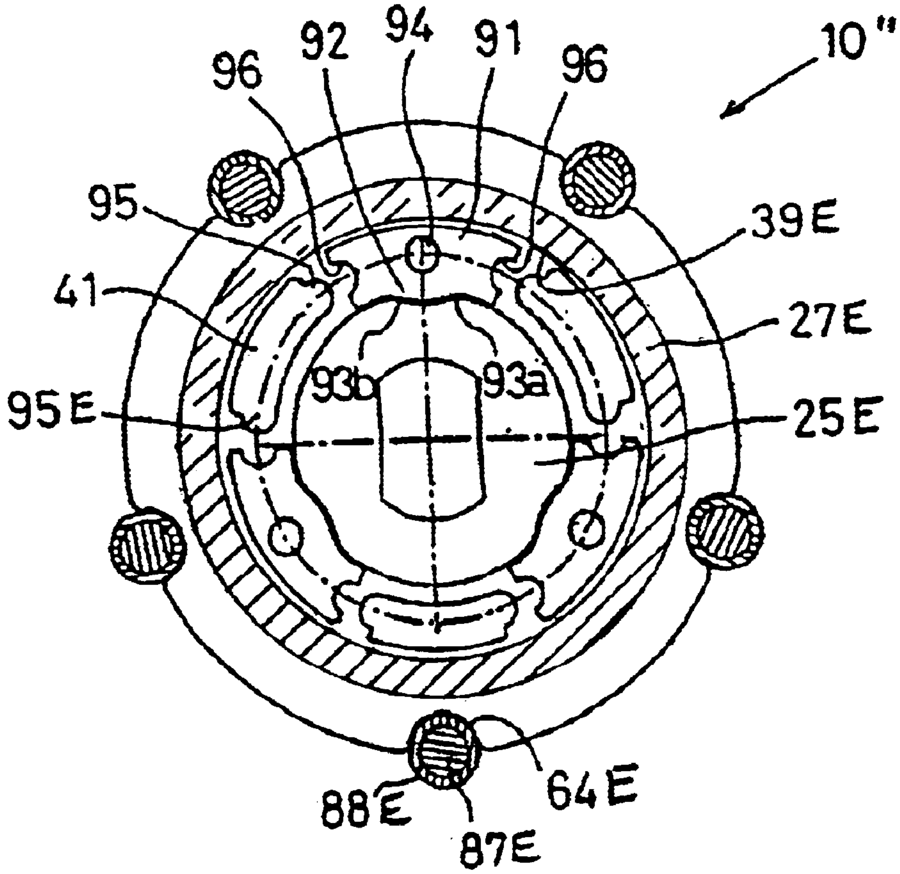
FIG. 18 is a partial cross-sectional view of an alternative construction of the locking structure of the spindle lock system.
Figure 19:
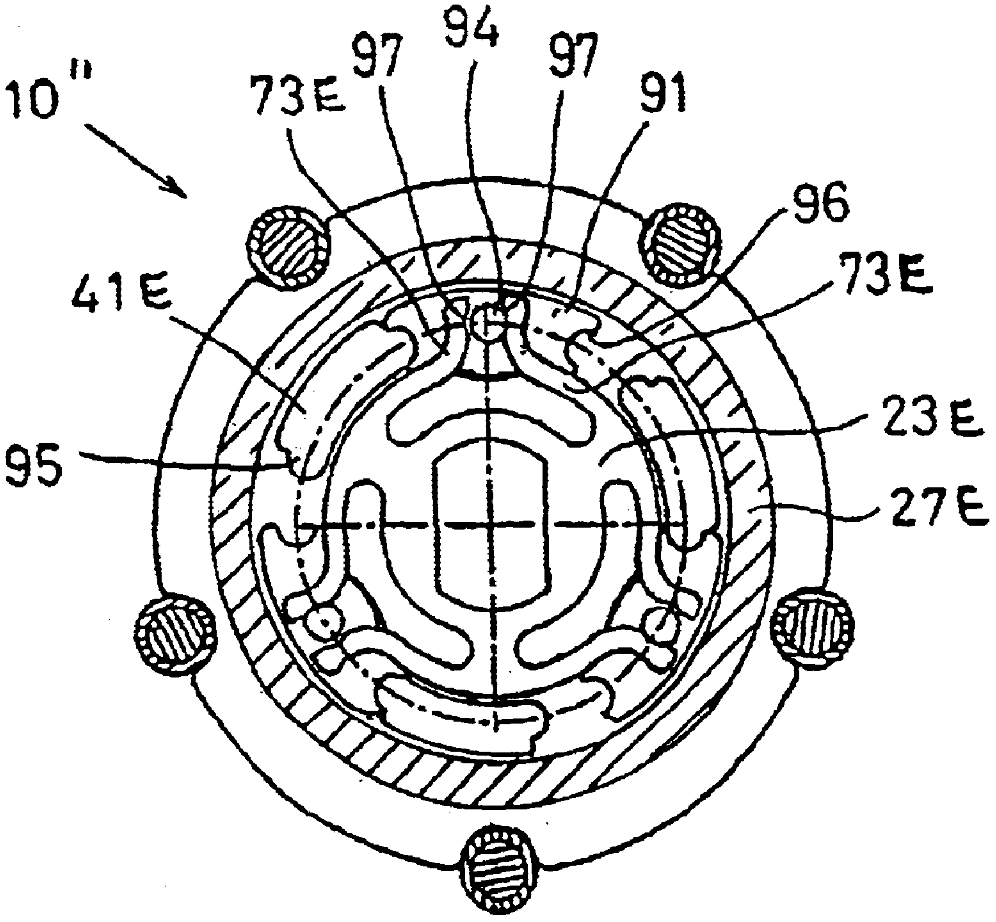
FIG. 19 is a partial cross-sectional view of the spindle lock system shown in FIG. 18 and illustrating the operating condition of the spindle lock system.

FIGS. 18–19 show an alternative construction of the locking structure 10E' of a spindle lock 10E. Common elements are identified by the same reference number "E".

In this construction, the locking structure 10E' includes locking elements, such as brake shoes 91, which are engageable between the inner circumference 39E of the fixing ring 27E and the outer circumference of the locking ring 25E to provide a locking and wedging action. Each brake shoe 91 is formed of a suitable frictional material, such as a metallic material, and the outer surface of each brake shoe 91 and the inner circumference 39E of the fixing ring 27E may be provided with inter-engaging projections and recesses, such as a serrated or pawl surfaces to provide a larger frictional resistance between the brake shoe 91 and the fixing ring 27E.

Each brake shoe 91 includes a centrally-located inner cam 92. On the outer circumference of the locking ring 25D, a corresponding recess portion receives each projecting cam 92 (in the unlocked position of the brake shoe 91). Raised cam surfaces 93*a* and 93*b* are provided on each side of this recessed portion to engage the projecting cam 92 (in either rotational direction) to force the brake shoe 91 to the locked position, in which the brake shoe 91 engages the inner circumference 39E of the fixing ring 27E.

In the illustrated construction, continued rotation of the spindle 28E, causes the locking ring 25E to rotate so that, in the selected direction, the raised cam surfaces 93*a* and 93*b* engage the projecting cam 92 to press the brake shoe 91 against the inner circumference 39E of the fixing ring 27E to stop the rotation of the spindle 28E. Locking and releasing of the brake shoes 91 is accomplished within the free rotational angle α between the spindle 28E and the carrier 15E.

A releasing protrusion 41E is provided between each brake shoe 91. The releasing protrusions 41E are driven by the carrier 15E and selectively engage the circumferential end portion of each brake shoe 91 to move the brake shoe 91 from the locked position to the unlocked position. On the circumferential end part of each releasing protrusion 41E and brake shoe 91, inter-engaging projections 95 and recesses 96 are formed. When these elements 95 and 96 are engaged, each brake shoe 91 is positioned in an unlocked position in which the outer circumference of the brake shoe 91 is radially spaced from the inner circumference 39E of the fixing ring 27E.

Each brake shoe 91 also includes a centrally-located axially-extending pin 94. The supporting ring 23E (which rotates with the spindle 28E) includes a pair of arms 73E which receive the pin 94. Recesses 97 are formed in each arm 73E for retaining the pin 94 in a unlocked position in which the outer circumference of the brake shoe 91 is spaced from the inner circumference 39E of the fixing ring 27E.

From the locked position of the locking structure 10E', the motor M is operated so that the carrier 15E moves the releasing protrusions 41E to engage the elements 95 and 96 and move the brake shoe 91 to the unlocked position. During this movement, the pin 94 is moved to engage the retaining recesses 97 formed between the arms 73E of the supporting ring 23E, and the brake shoe 91 is thus retained in the unlocked position radially spaced from the inner circumference 39E of the fixing ring 27E. The brake shoe 91 is retained in this unlocked position by engagement on one end by the releasing projection 41E and at the center by engagement of the pin 94 with the retaining recesses 97. In this unlocked position, because the brake shoes 91 are retained in a radially spaced position from the inner circumference 39E of the fixing ring 27E, there will not be inadvertent engagement of the brake shoe 91 with the fixing ring 27E so that no "scraping" sound will result during driving of the spindle 28E.

It should be understood, that in some aspects of the invention, the locking device 10" may include the wedge roller-type locking assembly, the brake shoe assembly or some other type of locking assembly.

It should be understood that, in some constructions (not shown), the controlling force applied by the snap ring 22 to maintain the projection 43 in the selected recess 42 may be applied in another direction (i.e., radially-inwardly or axially). It should also be understood that, in other constructions (not shown), the projection 43 may be formed separately from but engageable with the snap arm 44 so that the snap arm 44 applies a force to engage the projection 43 in the selected recess 42.

In accordance with the present invention, the resilient force provided by the rotation controlling device (including the snap ring 22 and the engagement between the projection 43 and the selected recess 42) controls and buffers the rotational inertia of the spindle 28 (and the chuck 120 and/or supported bit 124).

When the rotational inertia of the spindle 28 (and the chuck 120 and/or supported bit 124) is large, the resilient force applied by the snap ring 22 controls and buffers this increased rotational inertia so that no impact or "clunk" is caused when the spindle lock 10 engages to stop the rotation of the spindle 28.

When the rotational inertia of the spindle 28 (and the chuck 120 and/or the drill bit 124) is much greater than the resilient force of the snap ring 22 and even when the spindle 28 may rebound, the resilient force of the snap ring 22 buffers the rotational inertia at an early stage in the continued rotation of the spindle 28, greatly reducing this rotational force so that the spindle 28 does not impact and rebound and so that no "clunk" or "chattering" is caused during engagement of the spindle lock 10. With the present invention, the spindle lock provides a quiet stopping of the spindle 28 (no "clunk" or "chattering") and reduces any damage which might be caused to the components of the spindle lock 10 and the power tool.

The spindle lock 10 of the present invention provides for smooth constant locking and unlocking of the locking structure 10" and smooth and constant operation of the power tool.

Various independent features of the present invention are set forth in the following claims.

We claim:

1. A spindle lock for a power tool, the power tool including a housing, a motor supported by the housing and including a motor shaft, and a spindle supported by the housing for rotation about an axis, a driving connection being provided between the spindle and the motor shaft such that the spindle is drivingly connectable to the motor shaft, the spindle being selectively driven by the motor in a first direction about the axis and in a second direction about the axis, the second direction being opposite to the first direction, said spindle lock comprising:

a first locking member;

a second locking member movable between a locked position, in which the second locking member engages the first locking member to prevent rotation of the spindle, and an unlocked position;

a spring operable to delay movement of the second locking member from the unlocked position to the locked position when a force is applied to the spindle to cause the spindle to rotate relative to the driving connection; and a detent arrangement including a first recess and a second recess, and a projection engaged by the spring, the projection being selectively positioned in the first recess and in the second recess;

wherein, when the spindle is rotated in the first direction relative to the driving connection, the projection is movable between a first position, which corresponds to the unlocked position of the second locking member and in which the projection is positioned in the first recess, and a second position, in which the projection is positioned in the second recess, movement of the projection from the first recess delaying movement of the second locking member from the unlocked position to the locked position when the spindle is rotated in the first direction relative to the driving connection; and wherein, when the spindle is rotated in the second direction relative to the driving connection, the projection is movable between the second position, which corresponds to the unlocked position of the second locking member and in which the projection is positioned in the second recess, and the first position, in which the projection is positioned in the first recess, movement of the projection from the second recess delaying movement of the second locking member from the unlocked position to the locked position when the spindle is rotated in the second direction relative to the driving connection.

2. The spindle lock as set forth in claim 1 wherein, when the spindle is rotated in the first direction relative to the motor shaft, the spring applies a first spring force to the projection to bias the projection into the first recess and to delay movement of the second locking member from the unlocked position to the locked position, and wherein, when the spindle is rotated in the second direction relative to the motor shaft, the spring applies a second spring force to the projection to bias the projection into the second recess and to delay movement of the second locking member from the unlocked position to the locked position, the second spring force and the first spring force being substantially equal.

3. The spindle lock as set forth in claim 2 wherein the spring includes a first spring member and a second spring member, wherein the first spring member applies a first portion of the first spring force and the second spring member applies a second portion of the first spring force, and wherein the first spring member applies a first portion of the second spring force and the second spring member applies a second portion of the second spring force.

4. The spindle lock as set forth in claim 1 wherein the first locking member includes a first locking member portion defining a first locking surface and a second locking member portion defining a second locking surface, wherein the second locking member is a wedge roller positioned between the first locking member portion and the second locking member portion and positionable in a locked position, in which the wedge roller is wedged between the first locking surface and the second locking surface to prevent rotation of the spindle, and in an unlocked position, and wherein the spring is operable to delay movement of the wedge roller from the unlocked position to the locked position when a force is applied to the spindle to cause the spindle to rotate relative to the driving connection.

5. The spindle lock as set forth in claim 1 wherein the spring applies a spring force to the projection to bias the projection into a selected one of the first recess and the second recess.

6. The spindle lock as set forth in claim 5 wherein the spring applies the spring force to the projection in a radial direction to bias the projection into the selected one of the first recess and the second recess.

7. The spindle lock as set forth in claim 1 wherein the spring includes a spring arm having an arm end, the arm end providing the projection, the spring arm applying a spring force to bias the arm end into engagement with a selected one of the first recess and the second recess.

8. The spindle lock as set forth in claim 1 wherein, when the spindle is rotated in the first direction, the second position of the projection corresponds to the locked position of the second locking member; and wherein, when the spindle is rotated in the first direction, the projection engages the second recess to releasably maintain the second locking member in the locked position.

9. The spindle lock as set forth in claim 8 wherein, when the spindle is rotated in the second direction, the first position of the projection corresponds to the locked position of the second locking member; and wherein, when the spindle is rotated in the second direction the projection engages the first recess to releasably maintain the second locking member in the locked position.

10. The spindle lock as set forth in claim 1 wherein the first locking member includes a first locking member portion defining a first locking surface and a second locking member portion defining a second locking surface, wherein the second locking member is a brake shoe positioned between the first locking member portion and the second locking member portion and positionable in a locked position, in which the brake shoe is wedged between the first locking surface and the second locking surface to prevent rotation of the spindle, and in an unlocked position, and wherein the spring is operable to delay movement of the brake shoe from the unlocked position to the locked position when a force is applied to the spindle to cause the spindle to rotate relative to the driving connection.

11. The spindle lock as set forth in claim 10 wherein the outer surface of the brake shoe and the inner circumference of the first locking member are provided with inter-engaging projections and recesses.

12. A spindle lock for a power tool, the power tool including a housing, a motor supported by the housing and including a motor shaft, and a spindle supported by the housing for rotation about an axis, a driving connection being provided between the spindle and the motor shaft such that the spindle is drivingly connectable to the motor shaft, the spindle being selectively driven by the motor in a first direction about the axis and in a second direction about the axis, the second direction being opposite to the first direction, said spindle lock comprising:

a first locking member;

a second locking member movable between a locked position, in which the second locking member engages the first locking member to prevent rotation of the spindle, and an unlocked position;

a spring operable to delay movement of the second locking member from the unlocked position to the locked position when a force is applied to the spindle to cause the spindle to rotate relative to the driving connection; and a detent arrangement including a first recess and a second recess, and a projection engaged by the spring, the projection being selectively positioned in the first recess and in the second recess;

wherein the spring applies a spring force to the projection to bias the projection into a selected one of the first recess and the second recess;

wherein, when the spindle is rotated in the first direction relative to the motor shaft, the spring applies a first spring force to the projection to bias the projection into the first recess and to delay movement of the second locking member from the unlocked position to the locked position; and wherein, when the spindle is rotated in the second direction relative to the motor shaft, the spring applies a second spring force to the projection to bias the projection into the second recess and to delay movement of the second locking member from the unlocked position to the locked position, the second spring force and the first spring force being substantially equal.

13. The spindle lock as set forth in claim 12 wherein, when the spindle is rotated in the first direction, the projection is movable between a first position, which corresponds to the unlocked position of the second locking member and in which the projection is positioned in the first recess, and a second position, in which the projection is positioned in the second recess, movement of the projection from the first recess delaying movement of the second locking member from the unlocked position to the locked position when the spindle is rotated in the first direction relative to the driving connection; and wherein, when the spindle is rotated in the second direction relative to the driving connection, the projection is movable between the second position, which corresponds to the unlocked position of the second locking member and in which the projection is positioned in the second recess, and the first position, in which the projection is positioned in the first recess, movement of the projection from the second recess delaying movement of the second locking member from the unlocked position to the locked position when the spindle is rotated in the second direction relative to the driving connection.

14. The spindle lock as set forth in claim 12 wherein the spring includes a first spring member and a second spring member, wherein the first spring member applies a first portion of the first spring force and the second spring member applies a second portion of the first spring force, and wherein the first spring member applies a first portion of the second spring force and the second spring member applies a second portion of the second spring force.

15. The spindle lock as set forth in claim 12 wherein the spring applies the spring force to the projection in a radial direction to bias the projection into the selected one of the first recess and the second recess.

16. A spindle lock for a power tool, the power tool including a housing, a motor supported by the housing and including a motor shaft, and a spindle supported by the housing for rotation about an axis, a driving connection being provided between the spindle and the motor shaft such that the spindle is drivingly connectable to the motor shaft, the spindle being selectively driven by the motor in a first direction about the axis and in a second direction about the axis, the second direction being opposite to the first direction, said spindle lock comprising:

a first locking member;

a second locking member movable between a locked position, in which the second locking member engages the first locking member to prevent rotation of the spindle, and an unlocked position;

a spring operable to delay movement of the second locking member from the unlocked position to the locked position when a force is applied to the spindle to cause the spindle to rotate relative to the driving connection, the spring including a first spring member and a second spring member; and a detent arrangement including a first recess and a second recess, and a projection engaged by the spring, the projection being selectively positioned in the first recess and in the second recess;

wherein the spring applies a spring force to the projection to bias the projection into a selected one of the first recess and the second recess;

wherein, when the spindle is rotated in the first direction relative to the motor shaft, the spring applies a first spring force to the projection to bias the projection into the first recess and to delay movement of the second locking member from the unlocked position to the locked position;

wherein, when the spindle is rotated in the second direction relative to the motor shaft, the spring applies a second spring force to the projection to bias the projection into the second recess and to delay movement of the second locking member from the unlocked position to the locked position, the second spring force and the first spring force being substantially equal; and wherein the first spring member applies a first portion of the first spring force and the second spring member applies a second portion of the first spring force, and wherein the first spring member applies a first portion of the second spring force and the second spring member applies a second portion of the second spring force.

17. The spindle lock as set forth in claim 16 wherein the spring applies the spring force to the projection in a radial direction to bias the projection into the selected one of the first recess and the second recess.

18. The spindle lock as set forth in claim 16 wherein the first portion of the first spring force applied by the first spring member and the second portion of the first spring force applied by the second spring member are different spring forces.

19. The spindle lock as set forth in claim 18 wherein the first portion of the second spring force applied by the first spring member and the second portion of the second spring force applied by the second spring member are different spring forces.

20. The spindle lock as set forth in claim 16 wherein the first portion of the first spring force applied by the first spring member and the first portion of the second spring force applied by the first spring member are different spring forces.

21. The spindle lock as set forth in claim 20 wherein the second portion of the first spring force applied by the second spring member and the second portion of the second spring force applied by the second spring member are different spring forces.

22. The spindle lock as set forth in claim 16 wherein the first spring member includes a first spring arm having a first arm end, the first arm end providing a first projection, wherein the second spring member includes a second spring arm having a second arm end, the second arm end providing a second projection, the first projection and the second projection being selectively positioned in the first recess and in the second recess.

23. The spindle lock as set forth in claim 22 wherein the first spring member includes a first spring body, the first spring arm extending arcuately in a first direction from the first spring body, wherein the second spring member includes a second spring body, the second spring arm extending arcuately in a second direction from the second spring body, the second direction being different than the first direction.

24. The spindle lock as set forth in claim 23 wherein the first spring member and the second spring member are substantially identical, the second spring member being supported in a reversed orientation relative to the first spring member.

25. A spindle lock for a power tool, the power tool including a housing, a motor supported by the housing and including a motor shaft, and a spindle supported by the housing for rotation about an axis, a driving connection being provided between the spindle and the motor shaft such that the spindle is drivingly connectable to the motor shaft, the spindle being selectively driven by the motor in a first direction about the axis and in a second direction about the axis, the second direction being opposite to the first direction, said spindle lock comprising:

- a first locking member defining a first locking surface;
- a second locking member defining a second locking surface;
- a wedge roller positioned between the first locking member and the second locking member and positionable in a locked position, in which the wedge roller is wedged between the first locking surface and the second locking surface to prevent rotation of the spindle, and in an unlocked position;
- a spring operable to delay movement of the wedge roller from the unlocked position to the locked position when a force is applied to the spindle to cause the spindle to rotate relative to the driving connection; and
- a detent arrangement including
  - a first recess and a second recess, and
  - a projection engaged by the spring, the projection being selectively positioned in the first recess and in the second recess;
- wherein, when the spindle is rotated in the first direction relative to the driving connection, the projection is movable between a first position, which corresponds to the unlocked position of the wedge roller and in which the projection is positioned in the first recess, and a second position, in which the projection is positioned in the second recess, movement of the projection from the first recess delaying movement of the wedge roller from the unlocked position to the locked position when the spindle is rotated in the first direction relative to the driving connection; and
- wherein, when the spindle is rotated in the second direction relative to the driving connection, the projection is movable between the second position, which corresponds to the unlocked position of the wedge roller and in which the projection is positioned in the second recess, and the first position, in which the projection is positioned in the first recess, movement of the projection from the second recess delaying movement of the wedge roller from the unlocked position to the locked position when the spindle is rotated in the second direction relative to the driving connection.

26. The spindle lock as set forth in claim 25 wherein the wedge roller defines a roller axis, and wherein said spindle lock further comprises an alignment member engageable with the wedge roller to maintain the wedge roller in an orientation in which the roller axis is parallel to the spindle axis.

27. The spindle lock as set forth in claim 26 wherein the wedge roller has an outer roller surface and a length, wherein the first locking surface and the second locking surface extend parallel to the spindle axis, and wherein the alignment member maintains the wedge roller in an orientation in which the roller axis is parallel to the first locking surface and the second locking surface such that, in the locked position, a first portion of the outer surface roller surface engages the first locking surface along a substantial portion of the length of the wedge roller and a second portion of the outer surface roller surface engages the second locking surface along a substantial portion of the length of the wedge roller.

28. The spindle lock as set forth in claim 25 and further comprising:

- a second wedge roller positioned between the first locking member and the second locking member and positionable in a locked position, in which the wedge roller is wedged between the first locking surface and the second locking surface to prevent rotation of the spindle, and in an unlocked position; and
- a synchronizing member engageable with the first-mentioned wedge roller and the second wedge roller such that the first-mentioned wedge roller and the second wedge roller simultaneously move to the respective locked positions.

29. The spindle lock as set forth in claim 28 wherein the first-mentioned wedge roller has a first outer roller surface and a length, wherein the second wedge roller has a second outer roller surface and a length, wherein the first wedge surface and the second wedge surface extend parallel to the spindle axis, wherein the synchronizing member maintains the first-mentioned wedge roller in an orientation in which the first roller axis is parallel to the first wedge surface such that, in the locked position, the first outer surface roller surface engages the first wedge surface along a substantial portion of the length of the first wedge roller, and wherein the synchronizing member maintains the second wedge roller in an orientation in which the second roller axis is parallel to the second wedge surface such that, in the locked position, the second outer surface roller surface engages the second wedge surface along a substantial portion of the length of the second wedge roller.

30. The spindle lock as set forth in claim 25 and further comprising a release member selectively engageable with the locking member to move the locking member from the locked position to the unlocked position.

31. A power tool comprising:

- a housing;
- a motor supported by the housing and including a motor shaft;
- a spindle supported by the housing for rotation about an axis, a driving connection being provided between the spindle and the motor shaft such that the spindle is drivingly connectable to the motor shaft, the spindle being selectively driven by the motor in a first direction about the axis and in a second direction about the axis, the second direction being opposite to the first direction; and
- a spindle lock including
  - a first locking member,
  - a second locking member movable between a locked position, in which the second locking member engages the first locking member to prevent rotation of the spindle, and an unlocked position, a spring operable to delay movement of the second locking member from the unlocked position to the locked position when a force is applied to the spindle to cause the spindle to rotate relative to the driving connection, and a detent arrangement including a first recess and a second recess, and a projection engaged by the spring, the projection being selectively positioned in the first recess and in the second recess;

wherein, when the spindle is rotated in the first direction relative to the driving connection, the projection is movable between a first position, which corresponds to the unlocked position of the second locking member and in which the projection is positioned in the first recess, and a second position, in which the projection is positioned in the second recess, movement of the projection from the first recess delaying movement of the second locking member from the unlocked position to the locked position when the spindle is rotated in the first direction relative to the driving connection; and wherein, when the spindle is rotated in the second direction relative to the driving connection, the projection is movable between the second position, which corresponds to the unlocked position of the second locking member and in which the projection is positioned in the second recess, and the first position, in which the projection is positioned in the first recess, movement of the projection from the second recess delaying movement of the second locking member from the unlocked position to the locked position when the spindle is rotated in the second direction relative to the driving connection.

32. The power tool as set forth in claim 31 and further comprising a battery power source selectively connectable to the motor to operate the motor.

33. The power tool as set forth in claim 31 wherein the spring is positioned between the spindle and the locking member.

34. The power tool as set forth in claim 32 wherein the spindle lock further includes a release member selectively engageable with the locking member to move the locking member from the locked position to the unlocked position.

35. The power tool as set forth in claim 34 wherein, when the locking member is in the locked position, operation of the motor to rotatably drive the spindle causes the release member to engage and move the locking member from the locked position to the unlocked position.

36. The power tool as set forth in claim 31 wherein, when the spindle is rotated in the first direction relative to the motor shaft, the spring applies a first spring force to the projection to bias the projection into the first recess and to delay movement of the second locking member from the unlocked position to the locked position, and wherein, when the spindle is rotated in the second direction relative to the motor shaft, the spring applies a second spring force to the projection to bias the projection into the second recess and to delay movement of the second locking member from the unlocked position to the locked position, the second spring force and the first spring force being substantially equal.

37. The power tool as set forth in claim 36 wherein the spring includes a first spring member and a second spring member, wherein the first spring member applies a first portion of the first spring force and the second spring member applies a second portion of the first spring force, and wherein the first spring member applies a first portion of the second spring force and the second spring member applies a second portion of the second spring force.

38. The power tool as set forth in claim 31 wherein the first locking member includes a first locking member portion defining a first locking surface and a second locking member portion defining a second locking surface, wherein the second locking member is a wedge roller positioned between the first locking member portion and the second locking member portion and positionable in a locked position, in which the wedge roller is wedged between the first locking surface and the second locking surface to prevent rotation of the spindle, and in an unlocked position, and wherein the spring is operable to delay movement of the wedge roller from the unlocked position to the locked position when a force is applied to the spindle to cause the spindle to rotate relative to the driving connection.

39. The power tool as set forth in claim 31 wherein the spring applies a spring force to the projection to bias the projection into a selected one of the first recess and the second recess.

40. The power tool as set forth in claim 39 wherein the spring applies the spring force to the projection in a radial direction to bias the projection into the selected one of the first recess and the second recess.

41. The power tool as set forth in claim 31 wherein the spring includes a spring arm having an arm end, the arm end providing the projection, the spring arm applying a spring force to bias the arm end into engagement with a selected one of the first recess and the second recess.

42. The power tool as set forth in claim 31 wherein, when the spindle is rotated in the first direction, the second position of the projection corresponds to the locked position of the second locking member, and wherein, when the spindle is rotated in the first direction, the projection engages the second recess to releasably maintain the second locking member in the locked position.

43. The power tool as set forth in claim 42 wherein, when the spindle is rotated in the second direction, the first position of the projection corresponds to the locked position of the second locking member; and wherein, when the spindle is rotated in the second direction the projection engages the first recess to releasably maintain the second locking member in the locked position.

44. A spindle lock for a power tool, the power tool including a housing, a motor supported by the housing and including a motor shaft, and a spindle supported by the housing for rotation in a direction about an axis, a driving connection being provided between the spindle and the motor shaft such that the spindle is drivingly connectable to the motor shaft, said spindle lock comprising:

a first locking member defining a first locking surface;

a second locking member defining a second locking surface;

a wedge roller positioned between the first locking member and the second locking member and positionable in a locked position, in which the wedge roller is wedged between the first locking surface and the second locking surface to prevent rotation of the spindle, and in an unlocked position, the wedge roller defining a roller axis, the wedge roller being movable in the direction and having a leading portion and a trailing portion; and an alignment member engageable with the trailing portion of the wedge roller from the unlocked position toward the locked position to maintain the wedge roller in an orientation in which the roller axis is parallel to the spindle axis, the leading portion of the wedge roller not being engaged by a structure from the unlocked position toward the locked position.

45. The spindle lock as set forth in claim 44 wherein the wedge roller has an outer roller surface and a length, wherein the first locking surface and the second locking surface extend parallel to the spindle axis, and wherein the alignment member maintains the wedge roller in an orientation in which the roller axis is parallel to the first locking surface and the second locking surface such that, in the locked position, a first portion of the outer surface roller surface engages the first locking surface along a substantial portion of the length of the wedge roller and a second portion of the outer surface roller surface engages the second locking surface along a substantial portion of the length of the wedge roller.

46. The spindle lock as set forth in claim 44 wherein the wedge roller has an outer roller surface, a first axial end and a second axial end, and wherein the alignment member engages the outer roller surface adjacent the first axial end and the second axial end.

47. The spindle lock as set forth in claim 44 wherein the alignment member engages the trailing portion of the wedge roller from the unlocked position to the locked position.

48. The spindle lock as set forth in claim 47 wherein the alignment member engages the trailing portion of the wedge roller in the locked position.

49. A spindle lock for a power tool, the power tool including a housing, a motor supported by the housing and including a motor shaft, and a spindle supported by the housing for rotation about an axis, a driving connection being provided between the spindle and the motor shaft such that the spindle is drivingly connectable to the motor shaft, the spindle being selectively driven by the motor in a first direction about the axis and in a second direction about the axis, the second direction being opposite to the first direction, said spindle lock comprising:

a first locking member;

a second locking member movable between a locked position, in which the second locking member engages the first locking member to prevent rotation of the spindle, and an unlocked position;

a spring operable to delay movement of the second locking member from the unlocked position to the locked position when a force is applied to the spindle to cause the spindle to rotate relative to the driving connection; and a detent arrangement including a recess, and a projection engaged by the spring, the projection being selectively positioned in the recess;

wherein, when the spindle is rotated in the first direction relative to the driving connection, the projection is movable from a first position, which corresponds to the unlocked position of the second locking member and in which the projection is positioned in the recess, in the first direction to a second position, in which the projection is positioned outside of the recess, movement of the projection from the recess delaying movement of the second locking member from the unlocked position to the locked position when the spindle is rotated in the first direction relative to the driving connection; and wherein, when the spindle is rotated in the second direction relative to the driving connection, the projection is movable from the first position, which corresponds to the unlocked position of the second locking member and in which the projection is positioned in the recess, in the second direction to a third position, in which the projection is positioned outside of the recess, movement of the projection from the recess delaying movement of the second locking member from the unlocked position to the locked position when the spindle is rotated in the second direction relative to the driving connection.

* * * * *

UNITED STATES PATENT AND TRADEMARK OFFICE

CERTIFICATE OF CORRECTION

PATENT NO. : 6,702,090 B2 
DATED : March 9, 2004
INVENTOR(S) : Daijiro Nakamura and Robert W. Klemm It is certified that error appears in the above-identified patent and that said Letters Patent is hereby corrected as shown below:

Title page,
Item [73], Assignee, should be -- Daijiro Nakamura, Hyogo, Japan -- not "Milwaukee Electric Tool Corporation, Brookfield, WI (US)"

Signed and Sealed this

First Day of June, 2004

JON W. DUDAS
*Acting Director of the United States Patent and Trademark Office*